US006660326B2

(12) United States Patent
Sano et al.

(10) Patent No.: US 6,660,326 B2
(45) Date of Patent: Dec. 9, 2003

(54) PRODUCTION METHOD FOR MONOLAYER POWDER FILM AND PRODUCTION APPARATUS THEREFOR

(75) Inventors: Akihiro Sano, Shizuoka (JP); Kensaku Higashi, Shizuoka (JP)

(73) Assignee: Tomoegawa Paper Co. Ltd., Tokyo (JP)

( * ) Notice: Subject to any disclaimer, the term of this patent is extended or adjusted under 35 U.S.C. 154(b) by 167 days.

(21) Appl. No.: 09/912,426

(22) Filed: Jul. 26, 2001

(65) Prior Publication Data

US 2002/0031645 A1 Mar. 14, 2002

(30) Foreign Application Priority Data

Aug. 4, 2000 (JP) ....................................... 2000-237438
Jun. 26, 2001 (JP) ....................................... 2001-193121
Jun. 26, 2001 (JP) ....................................... 2001-193201

(51) Int. Cl.[7] ............................. B05D 1/24; B05D 3/12; C09J 7/02; B32B 5/30; G03B 21/00

(52) U.S. Cl. ....................... 427/180; 427/185; 427/242; 427/427; 156/230; 156/231; 156/241; 156/276; 428/143; 428/204; 428/914; 359/452; 359/536; 359/613

(58) Field of Search ................................ 156/230, 231, 156/233, 235, 239, 240, 241, 247, 277, 289, 276; 428/142, 143, 204, 210, 212, 914; 359/452, 453, 575, 528, 536, 613, 614; 427/164, 180, 184, 185, 202, 242, 421, 427

(56) References Cited

U.S. PATENT DOCUMENTS 3,988,816 A * 11/1976 Tada ........................ 29/116 R
4,162,842 A * 7/1979 Wu ......................... 355/2 DD
6,261,402 B1 * 7/2001 Watanabe et al. ........... 156/230
6,383,558 B1 * 5/2002 Fujiwara et al. ............ 427/164
6,444,076 B1 * 9/2002 Herndon et al. ............ 156/249
6,468,378 B1 * 10/2002 Hannington ................ 156/230

FOREIGN PATENT DOCUMENTS

JP A-5-302176 11/1993
JP A-9-318801 12/1997
JP 11-095004 * 4/1999 ............ G02B/3/00

* cited by examiner

*Primary Examiner*—J. A. Lorengo
(74) *Attorney, Agent, or Firm*—Arent Fox Kintner Plotkin & Kahn

(57) ABSTRACT

An adhesive layer is provided on a base material in the shape of an elongated film, powder particles are adhered thereon, and then other powder particles and media vibrated in a container are contacted with this adhesive layer. Next, the powder particles are embedded on the surface of the adhesive layer as a monolayer in which part of the powder particle protrudes, so as to form a laminate, and excess powder particles adhered to the laminate are removed. Therefore, a monolayer powder film, consisting of many powder particles embedded as a monolayer so that part thereof protrudes, is produced.

12 Claims, 10 Drawing Sheets

PRODUCTION METHOD FOR MONOLAYER POWDER FILM AND PRODUCTION APPARATUS THEREFOR

BACKGROUND OF THE INVENTION

The present invention relates to a continuous production method for a monolayer powder film in which powder particles are uniformly and closely embedded in the planar direction on the surface of an adhesive layer provided on a base material in the shape of an elongated film, so that part of the powder particle protrudes, and relates to a production apparatus for a monolayer powder film which is suitable for the production method.

As a method in which powder particles are adhered to a base material, (1) an electrostatic spray method in which charged powder particles are adhered on a base material by air spraying; (2) an electrostatic flowing and soaking method in which a base material is soaked in a powder coating material fluidized by charged air and powder particles are adhered to the base material by electrostatic attraction; and (3) an electrodeposition method in which charged powder particles are dispersed into solution and are supported on a base material by applying voltage; etc., can be generally used. In addition, (4) a method in which an adhesive layer consisting of uncured resin is previously formed on the surface of a base material, and powder coating materials adhered to the surface of film forming media are embedded in the adhesive layer by using external force such as vibration, is disclosed in Japanese Unexamined Patent Publication No. 5-302176. Furthermore, (5) methods in which an adhesive layer is formed on a base material, powder particles are placed on the adhesive layer, the surface thereof is leveled by skizing, and then the powder particles are embedded in the adhesive layer by presses, pressure rollers, etc., are disclosed in Japanese Unexamined Patent Publications No. 9-318801 and No. 11-95004.

However, powder film forming methods of the above (1) to (3) are methods for adhering powder particles on the surface of a base material in multiple layers, and the methods theoretically cannot form a monolayer powder film in which powder particles are uniformly filled in the planar direction at high density. In the coating method (5), when the powder particles are adhered to and embedded in an adhesive layer consisting of uncured liquid resin, the uncured liquid resin of the adhesive layer is pushed out on the surface and then the powder particles are adhered thereto. In this case, a multiple powder layer film is surely formed, since the above process is repeated until pushing out of the uncured liquid resin is stopped. In addition, in this coating method in which the film forming media and the base material are vibrated or stirred in a container at the same time, it is difficult to apply to base materials having a large area and a high flexibility such as an elongated film, and there are problems in that the apparatus is of increased size and in that the apparatus will become contaminated by scattered powder particles.

Furthermore, although the coating method (5) can be applied to a base material in the shape of an elongated film, there were problems in that dense regions and sparse regions in powder filling density in the planar direction are easily formed, the powder particles are arranged in the flowing direction in a line, striped defects easily occur, and the like. In addition, in this method, it was also difficult to embed the powder particles to a uniform depth in the adhesive layer over the entire surface of the base material due partially to pressure differences applied from presses or pressure rollers to the film. Furthermore, with respect to the partially pressure differences, there were problems in that an adhesive layer is easily formed as a multiple layer at a place at which a large pressure is applied because other powder particles are further adhered to adhesive oozed from adhered powder particles, and in that powder particle easily coming out occurs in cleaning processes for excess powder particles at a place at which a slight pressure is applied because powder particles have not been sufficiently embedded in the adhesive layer. This phenomenon is pronounced in the case in which a large area is coated or in the case in which powder particle having an average particle diameter of 15 $\mu$m or less is used. In particular, in the case in which the average particle diameter of powder particles to be used is 15 $\mu$m or less, since the specific surface area of the powder particle is increased and the fluidity of the powder particles is substantially deteriorated by effects of electrostatic attraction due to frictional electrostatic charging, van der Waals forces, etc., it was difficult for powder particles to be adhered uniformly to the surface of the adhesive layer at high densities. Furthermore, even if there was no problem in fluidity, in such powder particles, other powder particles cannot be embedded to uniform depth in spaces between the powder particles already adhered on the adhesive layer since the pressure from pressure rollers is dispersed and the pressure applied to each powder particle is lowered.

In addition, as an apparatus for embedding the powder particles on the surface of the adhesive layer, an excitation apparatus in which a container C set on an excitation mechanism V as shown in FIG. 10, is known. The container C consists of hard materials such as hard synthetic resin, metal, etc., and is formed in a bowl shape having an opening c1 at the upper portion thereof. A column portion c3 is protrudingly provided in the center of a bottom portion c2 so as to swell and protrude above and to reach the same height as the opening c1. The excitation mechanism V is composed as follows: a vibrating plate f3 is mounted on machine stand F by way of coil springs f1 and f2; a vertical axis f4 extending above to the center portion of an upper surface of the vibrating plate f3 is protrudingly provided; a motor f5 is fixed at the center of a lower surface of the vibrating plate f3; and a heavy weight f7 is attached eccentrically to this output shaft f6 of the motor f5. The container C is mounted on the vibrating plate f3 and is set by fixing the upper edge of the column c3 on the upper edge of the vertical axis f4, and then the container C is vibrated when the motor f5 is driven and the heavy weight f7 rotates.

Powder particles and pressure media were put into the container C of this excitation apparatus, a base material on which are coated an adhesive layer and adhered powder particles was passed through the pressure medium, while the container C was vibrated. Thus, the powder particles were embedded on the surface of the adhesive layer by being struck due to the vibrating pressure media in the container C, and a powder layer was thereby formed.

However, in the above excitation apparatus, since vibration of the pressure media at the center portion in the container C differs from that at the edge portion thereof, although a monolayer powder film in which the powder particles are uniformly filled in the planar direction at a high density can be formed when the base material is small, treatment in the container C is limited when a base material has a large area and high flexibility, such as a sheet in the shape of an elongated film and there is a problem in that embedding of the powder particles is insufficient in the width direction of the base material even if the treatment is carried out.

Therefore, it is an object of the present invention to provide a continuous production method for a monolayer powder film consisting of powder particles which are closely embedded on the surface of an adhesive layer provided on a base material in the shape of an elongated film as a monolayer, so that part of the powder particle protrudes and the powder particles are closely embedded, and a production apparatus for a monolayer powder film which is suitable for the production method. A "monolayer powder" according to the present invention refers to a state in which powder particles do not overlap in the thickness direction in a plane and they are covered at about the same height and at a high density so as to contact with each other. This monolayer powder can be applied to a general coating film for esthetic enhancement and for improving durability and strength of the surface, and to a film for polishing, non-slipping or slipping, light-reflecting or anti-reflecting, insulating or conducting, light condensing or diffusing, used in a flat lens or a translucent screen, etc.

SUMMARY OF THE INVENTION

A production method for a monolayer powder film according to the present invention consists of many powder particles embedded on the surface of an adhesive layer provided on a base material in the shape of an elongated film as a monolayer, so that part of the powder particle protrudes, and comprises forming the adhesive layer on at least one surface of the base material; adhering the powder particles to the adhesive layer so as to form a laminate; and removing excess powder particles adhering to the laminate.

In another aspect of a production method for a monolayer powder film according to the present invention, it is preferable that an embedding process be further provided after the powder adhering process in which the powder particles are embedded on the surface of the adhesive layer as a monolayer by contacting the adhesive layer with other powder particles and media vibrated in a container so that part of the powder particle protrudes.

A production apparatus for a monolayer powder film according to the present invention comprises an adhering device for adhering powder particles to an adhesive layer provided on a base material in the shape of an elongated film; an embedding device for embedding the powder particles in the width direction of the base material; and a removing device for removing excess powder particles, and wherein the monolayer powder film is continuously produced by embedding the powder particles on the surface of the adhesive layer provided on the base material as a monolayer, so that part of the powder particle protrudes.

An embedding device in the production apparatus for a monolayer powder film according to the present invention comprises a container for receiving the powder particles; a transfer roll for adhering the powder particles; a device for feeding the powder particles in specific amounts to the transfer roll; and a supporting member for contacting and transferring the powder particles, which are adhered to the transfer roll, to the adhesive layer provided on the base material.

According to the present invention, a monolayer powder film in which an adhesive layer 2 is formed on a base material in the shape of an elongated film 1 and a monolayer powder film 4 consisting of many powder particles 3 embedded on the surface of the adhesive layer 2 as a monolayer, so that part of the powder particle protrudes, as show in FIGS. 1A and 1B, can be preferably produced. FIG. 1A shows a sectional view of a monolayer powder film laminate and FIG. 1B shows a perspective view of a monolayer powder film laminate taken from a monolayer powder film side. In addition, the monolayer powder film 4 may set away from the base material in the shape of an elongated film 1, as shown FIG. 1A, and may contact therewith.

BEST MODE FOR CARRYING OUT THE INVENTION

Figure 1A:
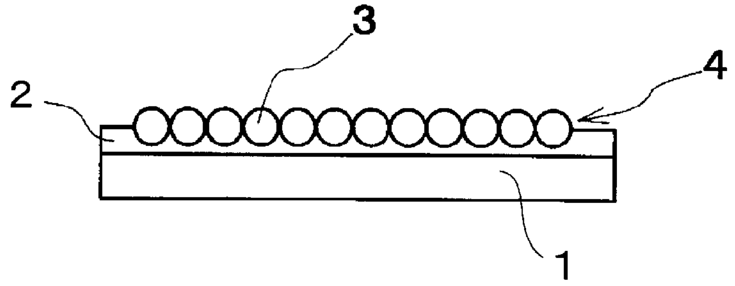
FIGS. 1A and 1B show a sectional schematic view of an example of a monolayer powder film obtained by a production method according to the present invention, and an oblique view, respectively.
Figure 1B:
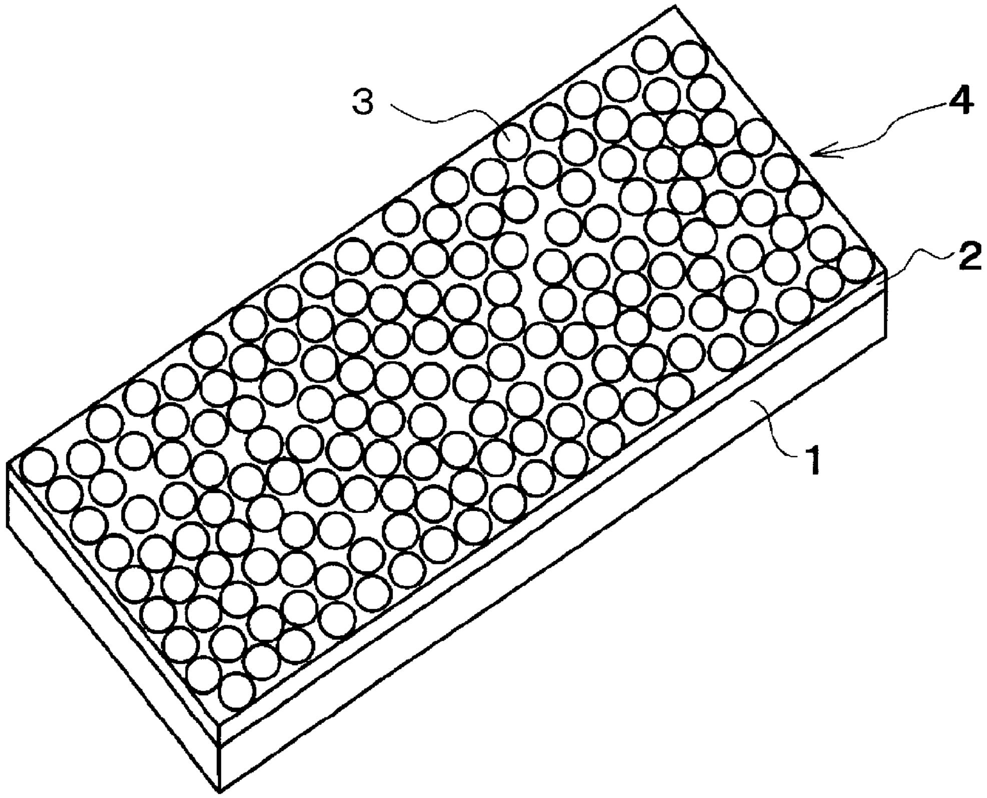

In the following, production methods for a monolayer powder film and production apparatuses which are suitable therefor will be explained in detail in order of processes for production.

A. Production Method for Monolayer Powder Film

1. Forming Process of Adhesive Layer

As a base material in the shape of an elongated film, a film shaped material having flexibility which can be wound in a roll can be used in the present invention. As a base material, various resin films consisting of polyethylene terephthalate (PET), polyethylene naphthalate (PEN), triacetyl cellulose (TAC), polycarbonate (PC), polyacrylate, polyimide (PI), aromatic polyamide, polysulfone (PS), polyethersulfone (PES), cellophane, polyethylene (PE), polypropylene (PP), polyvinyl alcohol (PVA), etc.; various paper sheets such as paper, coated paper, resin impregnated paper, etc.; various metal foils consisting of aluminum, stainless steel, etc.; and the like, can be employed. These may be employed alone, in combination, or by laminating. In addition, the base material in the shape of an elongated film may be a transparent base material or a non-transparent base material depending on the intended application, and in particular, the thickness of the base material is preferably 1 $\mu$m to 5 mm in consideration of productivity. The base material in the shape of an elongated film may be provided with an adhesive layer directly, or with another layer between the base material in the shape of an elongated film and the adhesive layer or on the rear surface of the base material in the shape of an elongated film.

In the present invention, an adhesive layer having adhesive strength is provided on the base material. Here, the term "adhesive strength" refers to as property of having sufficient adhesive strength to adhere powder particle describe below at room temperature, and any material in which adhesive strength between the base material and the powder particle is superior can be used. The "adhesive layer" in the present invention refers to a layer having an adhesive strength for at least a period from a process for adhering the powder particles to a process for embedding the powder particles, and for example, a layer which imparts the adhesive strength by applying solvent, etc., before the process for adhering the powder particles can be employed. As a material of such an adhesive layer, specifically, adhesives consisting of resin such as polyester type resin, epoxy type resin, polyurethane type resin, silicone type resin, acrylic type resin, etc., can be employed. These may be employed alone or in combination. In particular, an acrylic type adhesive is preferred, since water resistance, heat-resistance, light resistance, etc., are superior, adhesive strength and transparency are good, and in addition, the refractive index is easily adjusted when the adhesive is used for an optical use. As an acrylic type adhesive, a homopolymer or copolymer of an acrylic monomer such as acrylic acid and an ester thereof, methacrylic acid and an ester thereof, acrylamide, acrylic nitrile, etc., and a copolymer of at least one kind of the above acrylic monomers and aromatic vinyl monomer such as vinyl acetate, maleic anhydride, styrene, etc., can be employed. In particular, a copolymer consisting of a primary monomer for providing adhesiveness such as ethylene acrylate, butylacrylate, 2-ethylhexyl acrylate, etc., a monomer as a cohesion component such as vinyl acetate, acrylic nitrile, acrylamide, styrene, methacrylate, methylacrylate, etc., and a monomer having functional groups for improving adhesive strength and for initiating cross-linking, methacrylic acid, acrylic acid, itaconic acid, hydroxyethyl methacrylate, hydroxypropyl methacrylate, dimethylaminoethyl methacrylate, dimethylaminomethyl methacrylate, acrylamide, methylolacrylamide, glycidyl methacrylate, maleic anhydride, etc., can be preferably employed. The Tg (the glass transition point) of the copolymer is preferably −55 to −15° C. The weight average molecular weight thereof is preferably 250,000 or more.

In the case in which an adhesive layer consists of an adhesive in which the Tg is lower than −55° C. and an adhesive in which the weight average molecular weight is below 250,000, powder particles which did adhere are torn away by the impulsive force of media because the layer is too soft, and powder particle easily comes off, and thereby, the powder layer cannot be uniformly formed. In addition, when the powder particles are torn away, the adhesive remains on the surface thereof, and the powder particles then adhere to the powder layer again. Furthermore, in the case in which the adhesive layer is too soft, the parts to which the adhesive is adhered on the powder particles appears on the surface of the powder layer due to rotation of the powder particles on the surface of the adhesive layer due to the impulsive force of the media, or the adhesive oozes from openings between the powder particles by the impulsive force of the media or by capillarity. As a result, other powder particles adhere thereto, and multiple powder layers easily form. Therefore it is not preferable that the adhesive layer be too soft. In contrast, in the case of an adhesive layer in which the Tg is higher than −15° C., the adhesive strength is insufficient. As a result, the powder particles are not transferred even if the adhesive layer is contacted with the powder particles, the powder particles cannot be fixed in the adhesive layer even by the impulsive force of the media, or the powder particle easily falls off in the process of cleaning up excess powder particles, etc. It is preferable that adhesive strength (Japanese Industrial Standard Z-0237:1980) of the adhesive layer be 100 g/25 mm or more. In the case in which the adhesive strength is below 100 g/25 mm, the powder particle easily falls off.

In addition, in the adhesive, as a hardener, specifically, a crosslinking agent of the metal chelate type, isocyanate type, and epoxy type can be employed alone or in combination, as necessary. Furthermore, a photocurable-type adhesive added to the photopolymerizing monomer, oligomer, polymer and photopolymerization initiator may be employed in the adhesive. In addition, various additives such as coupling agents, surface tension adjusting agents, color pigments, dyes, waxes, thickeners, antioxidants, rust-preventive agents, antibacterial agents, ultraviolet absorbing agents, etc., may be added to the adhesive as necessary.

The adhesive may be diluted with organic solvent as necessary in order to obtain a suitable film thickness when the adhesive is provided on the base material by the following method. Specifically, alcohols such as methanol, ethanol, propanol, butanol, etc.; ketones such as methyl ethyl ketone, methyl isobutyl ketone, cyclohexanone, etc.; esters such as ethyl acetate, propyl acetate, butyl acetate, etc.; hydrocarbons such as toluene, xylene, etc.; ethers such as methyl cellosolve, ethyl cellosolve, butyl cellosolve, tetrahydrofuran, etc., can be employed.

As a method for forming the adhesive layer by applying the above adhesive on one side or both sides of the base material directly or indirectly through another layer, the following various coating and printing methods can be mentioned. As the coating method, air doctor coating, blade coating, knife coating, reverse coating, gravure roll coating, microgravure roll coating, kiss coating, spray coating, dam coating, dip coatings, die coating, etc., can be employed. As the printing method, letterpress printing such as flexography, etc.; intaglio printing such as direct gravure, offset gravure, etc.; lithographic printing such as offset printing, etc.; stencil printing such as screen printing, etc., can be employed.

It is necessary that the adhesive layer have sufficient thickness to embed the powder particles as a monolayer by the media. That is, it is preferable that the thickness of the adhesive layer be 0.01 to 2 times the diameter of the powder particle to be embedded. In the case in which the less is less than 0.01 times the diameter of the powder particle, the powder particle easily falls off. In contrast, in the case in which the thickness is thicker than 2 times the diameter of the powder particle, a state in which the part of powder particle protrudes from the surface of the adhesive layer cannot be formed by excessively embedding the powder particles, or a monolayer powder film cannot be formed by adhering other powder particles due to oozing of the adhesive through the powder particles of the powder monolayer film to the surface thereof.

In the present invention, although the following powder adhering process can be immediately carried out after the adhesive layer was provided by the above method, before the process, a process for adhering a separatable substrate to the adhesive layer in a state in which the adhesive layer was provided on the surface of the base material using various coating and printing methods, etc., and a process for exposing the adhesive layer by peeking the separatable substrate from the adhesive layer, may be carried out. Adhering of the separatable substrate is carried out, after the adhesive layer was provided by the above method such as coating, printing, etc., and was dried as necessary. A laminate in which the separatable substance was adhered can be temporarily stored. Subsequently, the following adhering process is carried out by peeling the separatable substrate. Since the laminate in which the separatable substrate is adhered on the adhesive layer can be stored by such a method, various monolayer powder films can be easily produced by changing the type of the powder particles and the production processes thereof can be easily composed.

As another method for forming an adhesive layer on a base material, a method in which an adhesive layer is previously provided on a separatable substrate and is dried as necessary, and then the adhesive layer is adhered to a base material, and the separatable substrate is peeled, can be mentioned. Since the laminate consisting of a base material/ an adhesive layer/a separatable substrate can be stored, this is advantageous from the viewpoint of various productions and production processes thereof.

A laminate consisting of a separatable substrate/an adhesive layer/a separatable substrate is formed by previously providing an adhesive layer on one separatable substrate and by adhering the other separatable substrate on the surface of the adhesive layer; then, the adhesive layer which is provided on the one separatable substrate is adhered to a base material by peeling the other separatable substrate; and subsequently, the adhesive layer can be transferred to the surface of the base material by peeling the one separatable substrate. If the laminate consisting of a separatable substrate/an adhesive layer/a separatable substrate is wound and is temporarily stored, it is possible to form the adhesive layer on various base materials, and therefore, the flexibility of the production increases. In a construction in which a separatable substrate is arranged on both sides of the adhesive layer, it is preferable that separating forces of the separatable substrate arranged on both sides be different. If the separating forces on the separatable substrates arranged on both sides are essentially the same, it is difficult to peel either of the separatable substrates.

In the case in which the hardener component is included in the adhesive layer, it is preferable that the above laminate consisting of a base material/an adhesive layer/a separatable substrate or consisting of a separatable substrate/an adhesive layer/a separatable substrate be aged at about 20 to 80° C. for about 3 to 14 days; hardness of the adhesive layer be stabilized by sufficiently reacting the adhesive and the hardener at the cross-linking point of the adhesive; and then the next process be carried out.

As a separatable substrate, common films or materials in the shape of a sheet, having peelability at the surface thereof which contacts with an adhesive layer, can be employed, and there is no limitation. Specifically, resin films such as polyethylene terephthalate, polyvinylchloride, polypropylene, polyethylene, cellulose acetate, etc.; synthetic paper, paper, and fabric, in which the resin is impregnated; metal foil such as aluminum foil, etc.; and laminates thereof, can be mentioned.

2. Powder Adhering Process

Next, in the production method for the monolayer powder film according to the present invention, the powder particles are adhered to the adhering layer formed on the base material, as described above. According to this procedure, carrier particles and media described below can be prevented form adhering to the adhesive layer, and falling off of the powder particle can be reduced by increasing the filling ratio of the powder particle.

As a powder in the present invention, any of inorganic powders and organic powders can be employed. Specifically, as an inorganic powder, metallic powder, alloy powder, oxide powder, nitride powder, or silicate powder, consisting of aluminum, zinc, copper, gold, silver, nickel, tungsten, iron, cerium, titanium, etc., carbon black powder, diamond powder, graphite powder, silica powder, glass powder, atomized kelmet powder, bronze powder, sodium montmorillonite powder, zircon sand powder, silicon carbide powder, boron carbide powder, silicon nitride powder, kaolin powder, talc powder, sericite powder, calcium carbonate powder, or the like, can be employed. As organic powders, powders consisting of various resins, such as acrylic resin, polystyrene resin, styrene-acrylic copolymer resin, urethane resin, silicone resin, phenol resin, epoxy resin, polyethylene resin, polypropylene resin, Teflon, polyvinylidene fluoride resin, urea resin, melamine resin, etc., can be employed.

It is preferable that the powder particle be globular and that the particle size distribution thereof be narrow, in order to embed the powder particles at the surface of the adhesive layer, in which the powder particles are provided on the base material, at a high filling density and a uniform depth. The specific particle size distribution is preferably 0.8 to 1.0, and more preferably 0.9 to 1.0. Roundness of the globular particles is preferably 80% or more, and more preferably 90% or more.

The particle size distribution of the powder particles is defined by the following general equation (1). Number average particle diameter and volume average particle diameter are measured by taking projection images of the powder particles using an optical microscope or a transmission electron microscope and by analyzing the images.

Particle size distribution=Number average particle diameter/Volume average particle diameter (1)

Number average particle diameter=An average value in which diameters of 100 powder particles sampled at random are measured and are averaged Volume average particle diameter=A diameter of powder particles in which powder particles are regarded as being true spheres; each volume is calculated by diameters of 100 powder particles sampled at random; and the volumes are added up in order from the smallest volume until the total is 50% of the total volume from all calculated volumes The roundness is defined by the following general equation (2), and specifically, it is calculated from A and B obtained by taking projection images of the powder particles using an optical microscope or a transmission electron microscope and by analyzing the images.

$$\text{Roundness}(\%)=(4\pi A/B^2)\times 100 \qquad (2)$$

A: Projected area of powder particles, B: Circumference of powder particles

The particle size (volume average particle size) of the powder particles in the present invention is preferably 1 to 50 μm, and more preferably 3 to 30 μm. In the case in which the particle size is smaller than 1 μm, the powder particles cannot be embedded in the adhesive layer as a monolayer. In contrast, in the case in which the particle size is greater than 50 μm, embedded depths of the powder particles in the adhesive layer are easily nonuniform from the viewpoint of weights and volumes thereof, and the powder particles easily fall off in the following process for removing excess powder particles, etc.

In the case in which the present invention is applied to an optical film having light diffusion properties, etc., it is preferable that the powder particle consist of material having a high optical transparency, such as acrylic resin, styrene resin, styrene-acrylic copolymer resin, silicone resin, etc., and that the particle size (volume average particle size) be 2 to 15 μm and that the particle size distribution and the roundness also be high.

As a specific method for adhering the powder particles to the adhesive layer, a method in which the adhesive layer is simply contacted with the upper surface of the powder particles which are put into a container, a method in which the adhesive layer is passed through the powder particles, a method in which the powder particles are sprinkled on the adhesive layer, and the like, can be employed. In addition, a method in which the powder particles in a container are vibrated or fluidized and a base material in which the adhesive layer is provided is passed under these fluidized powder particles, can be employed. In the case in which the particle size of the powder particle is small, it is more effective that fluidized air be used. Furthermore, a method in which the powder particles are sprayed on the adhesive layer by air spraying, can be employed. This method is suitable for uniformly adhering the powder particles to the surface of the adhesive layer, since it is easy to mix the powder particles with air. In this process for adhering the powder particles to the adhesive layer, it is sufficient if only the powder particles are adhered to the surface of the adhesive layer by the adhesive strength of the adhesive layer or by electrostatic adhesion, and there is no problem even if the powder particles are adhered so as to form multiple layers.

3. Powder Embedding Process

In the production method for the monolayer powder film of the present invention, a monolayer powder film is formed by contacting and transferring the powder particles with the surface of the adhesive layer on the base material in the above powder adhering process. Furthermore, in order to produce a more uniform monolayer powder film by controlling degree of the embedding of the powder particles in the adhesive layer, it is preferable that a process, in which a laminate is formed by contacting at least the adhesive layer on the base material with the powder particles and the media being vibrated in the container and by embedding the powder particles in the adhesive layer as a monolayer so that part thereof protrudes from the surface of the adhesive layer, be provided after the above powder adhering process.

The media in the present invention strike the above powder particles by impulsive force due to vibration thereof and the powder particles are embedded in the above adhesive layer. In particular, the medium is very important since the filling density of the monolayer powder film can be increased and be made more uniform by pushing other powder particles into the gaps between the powder particles which were first adhered to the adhesive layer. The medium is granular and is preferably globular, having a diameter of 0.1 to 3.0 mm. It is preferable that the particle size distribution and the roundness be of a higher level in order to embed the powder particles in the adhesive layer at a high filling density and uniform depth, although they need not be of a higher level than those of the above powder particles. In the case in which diameter of the medium is below 0.1 mm, the medium adheres to the adhesive layer with the powder particles, the ability to embedded the powder particles in the adhesive layer is insufficient, and there is a problem in the handling thereof since the diameter of the medium is too small. In contrast, in the case in which the diameter of the medium exceeds 3.0 mm, although enough impulsive force is obtained, it is difficult to embed the powder particles into the adhesive layer at a high filling density and uniform depth.

As a medium, specifically, a medium consisting of various metals and alloys such as iron, carbon steel, alloy steel, copper and copper alloy, aluminum and aluminum alloy; a medium consisting of ceramics such as alumina, silica, titania, zirconia, silicon carbide; a media containing particles such as glass, quartz, rigid plastic, hard rubber, etc., can be employed.

It is necessary that the medium employed in the present invention be suitably select according to thickness and adhesive strength of the adhesive layer, particle size, and specific gravity of the powder particle, embedded depth of the powder particle, etc. In the case in which the diameter of the medium is large, although the impulsive force may be large, uniformity thereof is insufficient since there is little opportunity to transmit the force to the adhesive layer, and the powder particle tends to easily fall off. In contrast, in the case in which the particle size is small, although the uniformity thereof increases, embedding force is reduced since the impulsive force is small. Embedding condition of the powder particles relate closely to the specific gravity of the medium. When material having a high density is used, the impulsive force increases even if the particle size is equal. In contrast, when material having a low density is used, the impulsive force decreases, and force for embedding the powder particles is inferior. Therefore, use of media having a comparatively small particle size and a high specific density generally tends to be preferable.

In the present invention, a state in which the above powder particles and media are sufficiently mixed by putting and vibrating these in the container and the powder particles are adhered to the surface of the media is preferred. At this time, the adhering the powder particles on the surface of the media may be formed as a monolayer or a multiple layer. It is necessary to previously confirm specific gravity and adhesive strength to the surface thereof, since a combination in which both are separated even by vibrating is not desirable.

As a container for containing powder particles and media therein, a container which can withstand the weight and vibration of the powder particles and the media, and the material and size thereof are not limited. However, the shape thereof must be designed so that an adhesive layer provided on a base material can contact with powder particles and media which are vibrating. In particular, in the case in which the powder particles are embedded in the adhesive layer by vibrating the container and by transferring force of the vibration to the powder particles and the media, it is preferable that a distance between a wall surface of the vibrating container and the adhesive layer, which sandwich the powder particles and the media therebetween, be uniform at least in a width direction of the base material in the shape of an elongated film, since impulsive force which is uniform at least in the width direction must be supplied from the powder particles and the media to the adhesive layer on the base material in the shape of an elongated film. The powder particles and the media can be vibrated without vibration of the container by another vibrating member such as a vibrating plate, etc., provided in the container. In this case, it is preferable that distances from a mounted position of the container and from the adhesive layer be uniform, so that uniform force is supplied to the adhesive layer on the base material in the shape of an elongated film. When the powder particles and the media are vibrated, it is necessary that the container be designed so that the powder particles and the media do not escape therefrom.

As a vibrator for vibrating the container containing the powder particles and the media, the vibrating plate mounted in the container, etc., general known vibrators such as vibration motors, air vibrators, electromagnetic vibrators, and mechanical vibrators using a cam, can be used. These vibrators can be used in various fields such as feeders, hoppers, conveyors, sieves, part feeders, part alignment machines, shaking tables, barrel polishers, etc. In the present invention, it is necessary that a suitable machine be selected from the vibrators in consideration of size of a base material in the shape of an elongated film, size and weight of media and a container, structure of an apparatus including these, etc. In addition, in any of the apparatuses, it is necessary to adjust the vibration mode, exciting force, and amplitude, in consideration of mounting positions to the container of the vibrator, selection of springs, etc., so that the powder particles are embedded in the adhesive layer at a high filling ratio and a uniform depth. The frequency thereof is preferably 200 to 4000 cpm, and more preferably 1000 to 3000 cpm. In the case in which the frequency is below 200 cpm, force in which the media embed the powder particles to the adhesive layer is insufficient, and the embedding process requires a long time. In contrast, when the frequency exceeds 4000 cpm, impulsive force is too strong, and there are problems in that the powder particles easily fall off the adhesive layer, or that vibration from the container or the vibrating member is difficult to transmit to the adhesive layer by being absorbed to the media. In these apparatus selection and condition decisions, in order to stably embed the powder particles in the adhesive layer for a long time, while feeding the base material in the shape of an elongated film which provides the adhesive layer, it is necessary that the powder particles and the media do not escape from the container, that they do not separate in the container, and that they do not accumulate on one side. In addition, it is preferable that the powder particles and the media be fluidized slowly, so that the part thereof which contacts with the adhesive layer is replaced.

4. Excess Powder Removing Process

Excess powder particles are adhered on the adhesive layer by interparticle forces such as electrostatic force, van der Waals force, etc., after the powder particles were embedded in the adhesive layer by the media, as described above, and therefore, it is necessary to remove the excess powder particles. As a method for removing the excess powder particles, a method for shaving them down by a blade, a method for brushing them off, a method for wiping them off, a method for blowing them off by an air blower (ultrasonic air blower), a method for absorbing them, etc., can be employed. However, in the case in which powder particles having a small particle size are used, or in the case in which adhesive strength between the powder particles is high, it is necessary that wet-type cleaning be carried out on the powder layer using a solution which adds water or a washing auxiliary agent, and then that the powder layer be sufficiently dried, since the excess powder particles are insufficiently removed by only the above dry-type cleaning. In addition, in the case in which the diameter of the powder particles is 15 $\mu$m or less, it is preferable that the powder layer be soaked in ion exchanged water to which is added a washing auxiliary agent such as a surfactant, etc., or the like, and be subjected to ultrasonic washing, etc., and then be rinsed sufficiently in deionized water, etc., since there is a risk that the excess powder particles will be insufficiently removed by use of fluidic pressure alone, although a water jet in which water is jetted out of a nozzle in a wet-type cleaning is effective. Furthermore, it is necessary to dry the powder layer after such a wet-type cleaning was finished. As a drying method, a method for squeezing out water by passing between rubber rolls, a method for absorbing and wiping off water using a roll, a mat, etc., having an absorbency, and a method for blowing water away by an air blower, can be employed. In the case in which, according to the type of base material or the powder particle, water cannot be removed by such methods, it is necessary to sufficiently expose it to cold or hot blown air, or to heat it using an infrared ray heater, so as to dry it.

In the production method of the monolayer powder film of the present invention, in order to eliminate tackiness of the adhesive layer or to improve surface strength, it is preferable that another resin layer be provided on the monolayer powder layer. According to this method, adjustment of all light transmittance or haze value, as an optical characteristic; prevention of blocking; improvement of reliability of an optical characteristic; etc., can be accomplished in an application to an optical film.

Although a material of the resin layer provided on the monolayer powder film is not limited, it is necessary to select from materials in which the powder particles laid in the monolayer powder film is not disturbed, destroyed, or damaged by infiltrating into the adhesive layer which embedded the powder particles when the resin layer is provided by a coating method or a printing method. In the case in which a coating material or an ink dissolved and diluted by organic solvent is used as a resin material, it is necessary that the solvent not swell or dissolve the adhesive layer in which the powder particles are embedded, or that the swelling or dissolving be slight. In the case in which an acrylic adhesive is used as an adhesive material, a ketone-type solvent, ester-type solvent, or aromatic hydrocarbon-type solvent cannot be used as a solvent in the resin layer provided on the monolayer powder film since the acrylic adhesive has a high solubility in these solvents. As a solvent in the resin layer, water, alcohol, or aliphatic hydrocarbon-type solvent, can be preferably employed. That is, as a usable resin in here, it is necessary to use resins which can be dissolved or diluted in these solvents.

As an alcohol, specifically, methanol, ethanol, n-propanol, isopropanol, n-butanol, isobutanol, tert-butanol, etc., can be employed. As a resin which can dissolve therein, acrylic resin such as polyisobutyl methacrylate, methyl methacrylate/butylmethacrylate copolymer, etc.; cellulose-type resin such as cellulose acetate propionate, cellulose acetate butyrate, etc.; butyral resin; shellac used for spirit varnish; etc., can be employed. As an aliphatic hydrocarbon-type solvent, chemical compositions such as n-hexane, isohexane, cyclohexane, n-heptane, n-octane, n-decane, n-hexadecane, n-tridecane, etc.; industrial gasolines fractionated by distillation such as petroleum ether, petroleum benzine, rubber volatiles, soybean volatiles, mineral spirits, etc., can be mentioned. As a resin which can be dissolved in these aliphatic hydrocarbon-type solvents, rosin resins, petroleum resins, rubber resins, terpene resins, etc., can be employed. As a water soluble coating, coatings selected from various water soluble resins and emulsions can be employed. In addition, an ultraviolet curable resin without solvent can be used directly or by diluting using solvents such as the above alcohol, etc. The ultraviolet curable resin contains a resin in which a photo radical polymerization initiator is added to a resin mixed with an acrylic oligomer or monomer, or a resin in which a photo cation polymerization initiator is mixed with an epoxy resin or oxetane compound, and it is classified as a urethane acrylate, polyester acrylate, epoxy acrylate, silicone acrylate, etc., by a main structure thereof. It is natural that these resins used in the present invention firmly bond to the adhesive layer or the powder particles on the surface of a coating base material.

In order to provide these resins on the monolayer powder film using various solvents, although various coating methods and printing methods as explained above can be used when the adhesive layer is previously provided, it is necessary to select a method in which the monolayer powder film be damaged as little as possible. Since the monolayer powder film has a rugged surface in which part of each powder particle protrudes, an additive such as a surfactant, etc., can be employed as necessary in order to prevent it from repelling or air from being trapped when a coating material or ink is coated or printed thereon. In order to impart functions or improve coating quality, various dyes and pigments can be added to this coating material or ink for the resin layer.

Although the resin layer provided on the monolayer powder film is laminated on the adhesive layer and the powder particles which are usually in the under layer thereof, the resin layer is not laminated on the powder particles and may be laminated on only the adhesive layer. Both laminations are useful in the present invention.

In the production method for the monolayer powder film of the present invention, a bonding layer, a coloring layer, a conductive layer, an electrifying layer, an anti-static layer, etc., can be provided between the base material in the shape of an elongated film and the adhesive layer, or on the rear surface of the base material in the shape of an elongated film, besides the laminations explained the above. Two layers or more consisting of different resins, respectively, can be formed on the surface of the monolayer powder film. In the case in which the present invention is applied to an optical film, light transparency, reflectivity, light diffusibility, etc., can be finely adjusted in consideration of refractive indexes of the base material, the adhesive layer, the powder particle, and the resin layer provided on the monolayer powder film as necessary.

In addition, in the production method of the present invention, the monolayer powder film can also be produced by carrying out all the above processes, and each process can also be discontinuously carried out. Since a base material in a state in which an adhesive layer is provided thereon cannot be stored by winding as described already, it is preferable that the base material be stored by winding after a separatable substrate was temporarily adhered, that it be stored by winding after powder particles to the adhesive layer were adhered, and that it be stored by winding after a monolayer powder layer was formed by contacting powder particles and media being vibrated in a container with the adhesive layer.

The base material adhering the powder particles on the adhesive layer or the base material embedding the powder particles in the adhesive layer by contacting the powder particles and the media, can be stored by only winding, since the surface thereof does not already have the adhesion. Although it is not necessary that the following processes be continuously carried out in this case, pressing damage occurs frequently on the base material and the adhesive layer when the base material is wound in this state, since powder particles are adhered in more than a monolayer formed at the surface of the adhesive layer and there is a strong probability that the powder particles will also adhere to the rear surface of the base material. Therefore, it is preferable that a process for removing excess powder particles be continuously carried out directly after these processes. In the case in which the excess powder particles removing process is continuously carried out, the base material can be protected from pressure in which pressing damage occurs thereon or on the adhesive layer form loading by winding while a soft material such as paper or film is sandwiched therebetween, or by winding while a paper or film in a tape shape is sandwiched at both edges thereof.

In the production method of the present invention, although a monolayer powder film can be provided on both surfaces of the base material at the same time or sequentially, in the case in which it was provided on one surface thereof, the monolayer powder film may be formed by carrying out another process such as coating, vapor deposition, adhesion processing, etc., on the rear surface thereof.

B. Production Apparatus for Monolayer Powder Film

Figure 2:
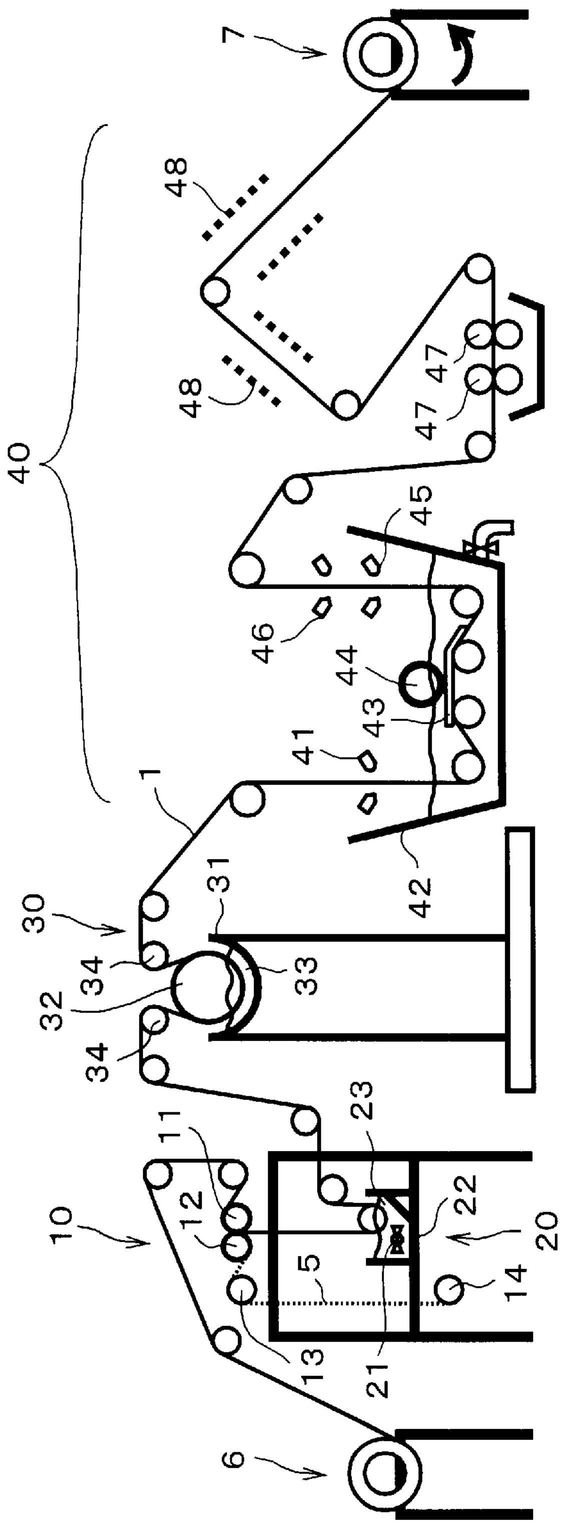
FIG. 2 shows a sectional schematic view of an example of a production apparatus for a monolayer powder film according to the present invention.

FIG. 2 shows a sectional view of an embodiment of a production apparatus for a monolayer powder film according to the present invention. As shown in FIG. 2, the production apparatus of the present invention comprises, in order from the left in the figure, an unwinding device 6 for unwinding a base material in the shape of an elongated film which is provided with an adhesive layer, a peeling device 10 for peeling a separatable substrate on an adhesive layer, a powder adhering device 20 for adhering powder particles to the surface of an adhesive layer, a powder embedding device 30 for embedding powder particles in an adhesive layer, an excess powder removing device 40 for removing excess powder particles, and a winding device 7 for winding a base material in the shape of an elongated film in which a monolayer powder film was formed. In the production apparatus for the monolayer powder film of the present invention, a device for forming an adhesive layer on a base material in the shape of an elongated film may be comprised before the powder adhering device. In this case, it is preferable to use a base material in the shape of an elongated film in which an adhesive layer is previously formed and a separatable substrate is provided thereon, since there are problems of stabilization of characteristics after forming the adhesive layer, powder contamination of the adhesive layer due to adjoining of the adhesive layer forming process and the powder adhering process, increasing of the total size of the apparatus when an adhesive layer forming device is continuously comprised, etc.

In the following, comprising devices and workings in the production apparatus for the monolayer powder film of the present invention will be explained in detail. The above unwinding device and winding device were omitted since known devices can be applied thereto.

1. Peeling Device

In a base material in the shape of an elongated film 1 used in the production apparatus for the monolayer powder film of the present invention, it is preferable that an adhesive layer be provided on at least one surface thereof and a separatable substrate be provided on the adhesive layer. In this case, it is necessary that a device 10 for peeling the separatable substrate be provided before a powder adhering device 20. It is not necessary to pay attention to the peeling of the separatable substrate, since general adhesive layers have a thickness of several decade μm, and one layer is adhered to the other layer through the adhesive layer. However, it is necessary that a separatable substrate be peeled while keeping the surface of the adhesive layer uniform, since the adhesive layer in a monolayer powder film has a thickness of several μm, and powder particles are adhered to the adhesive layer. In the case in which the surface of the adhesive layer is disturbed, the powder particles cannot be uniformly adhered, and a monolayer powder film in which the powder particles are uniformly and closely arranged in the planar direction cannot be formed.

Therefore, it is preferable that the peeling device 10 in the present invention comprise a heating roll 11, as shown in FIG. 2. The heating roll 11 is placed so as to make a pair with an opposing roll 12. The adhesive layer is heated by passing the base material in the shape of an elongated film 1 between these rolls 11 and 12, flexibility of the adhesive layer is increased, and thereby the separatable substrate 5 can be smoothly peeled. It is preferable that the peeling device 10 in the present invention peel the separatable substrate 5 at a specific uniform speed and at a specific angle against the base material 1 by a separatable substrate winding roll 14 via the roll 12 and a roll 13. According to this peeling method, the separatable substrate 5 can be stably peeled, and the surface of the adhesive layer can be kept uniform.

2. Powder Adhering Device

As a powder adhesive device in the present invention, a device for simply contacting an adhesive layer with the upper surfaces of powder particles put into a container; a device for passing an adhesive layer into powder particles; a device for sprinkling powder particles on an adhesive layer; a device for spraying powder particles on an adhesive layer using an air sprayer; etc., can be employed. In particular, a mechanism for uniformly fluidizing powder particles in the width direction of the base material, specifically, a device in which powder particles 23 are uniformly fluidized in the width direction of the base material in a container 22, using a parallel stirrer 21 in the width direction of a base material as shown in FIG. 2, a vibrator, a fluidizing air, etc., and the base material 1 which provides an adhesive layer is passed into the fluidized powder particles 23, can be preferably employed. As a result, the filling ratio of the powder particle on the adhesive layer can be increased and powder particle falling off can be reduced. In addition, the powder particles may be adhered to the adhesive layer by vibrating a container containing the powder particles as a powder adhering device.

The above stirrer is not limited to a blade shape. The stirrer may be of other shapes such as a spiral shape, etc., or may have two stirring blades or more, if the powder particles can be uniformly fluidized in a width direction of the base material 1. In this process, it is sufficient if only the powder particles are adhered to the surface of the adhesive layer by adhesive strength of the adhesive layer or by electrostatic adhesion, and there is no problem even if the powder particles are adhered so as to form multiple layers.

Figure 3:
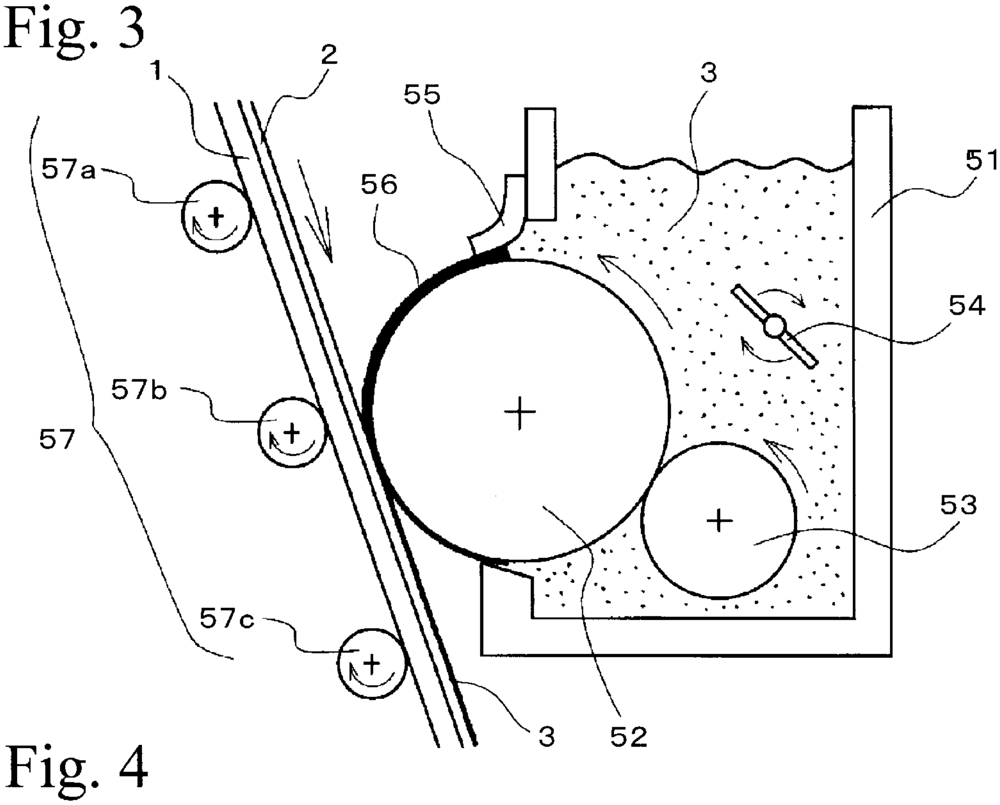
FIG. 3 shows a sectional schematic view of a transfer roll which is an example of a powder adhering device in a production apparatus for a monolayer powder film according to the present invention.
Figure 4:
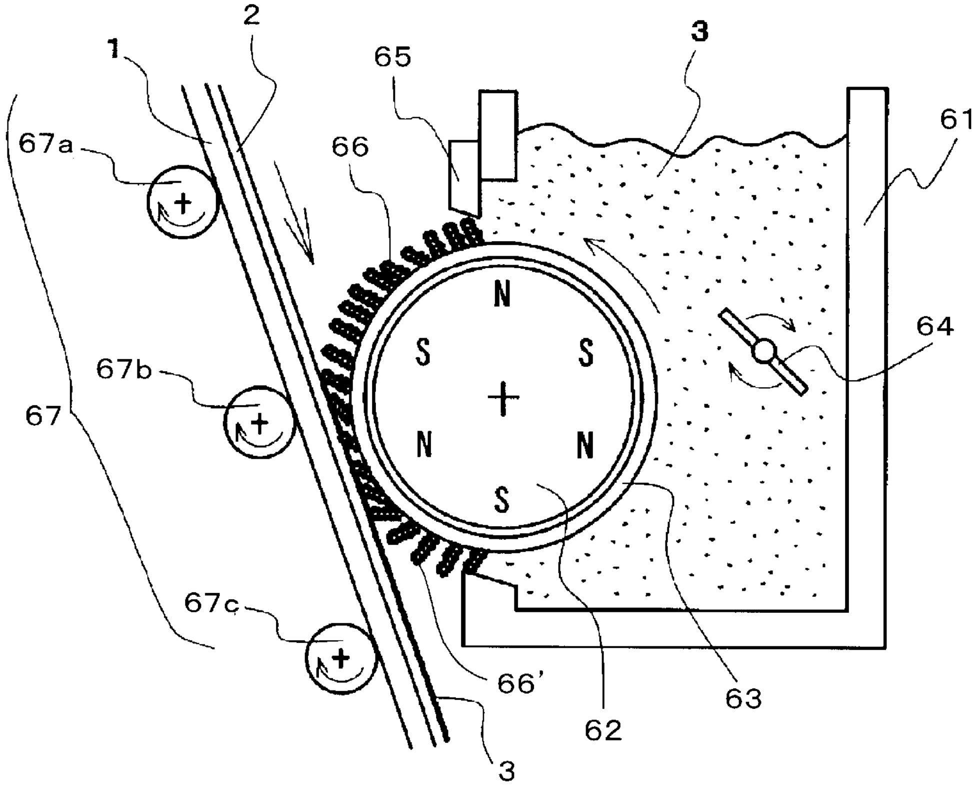
FIG. 4 shows a sectional schematic view of a magnetic brush which is an example of a powder adhering device in a production apparatus for a monolayer powder film according to the present invention.

In addition, as a powder adhering device in the present invention, powder adhering apparatuses as shown in FIGS. 3 and 4 can be employed. FIG. 3 shows an example of apparatus for forming a monolayer powder film by contacting and transferring powder particles, which are adhered to the surface of a transfer roll, with an adhesive layer on a base material. In FIG. 3, reference numeral 51 is a container for holding powder particles 3. The container 51 comprises a transfer roll 52, a roll shaped feeding member 53 for feeding the powder particles 3 in specific amounts to the surface of the transfer roll 52, and a stirrer 54 in which fluidization of the powder particles 3 is increased by stirring, and the powder particles 3 are easily adhered to the surface of the transfer roll 52. In the case in which the transfer roll 52 is rotated in the arrow direction, the powder particles 3 on the surface of the transfer roll 52 are adjusted in amount by a layer thickness controlling member 55 such as a doctor blade, etc., and an adhered powder layer 56 is formed on the surface of the transfer roll 52.

The base material in the shape of an elongated film 1 which provides an adhesive layer 2, is fed to the arrow direction in the figure and the adhesive layer 2 is contacted with the adhered powder layer 56 formed on the surface of the transfer roll 52. Consequently, the powder particles 3 which is part of the adhered powder layer 56 are transferred from the adhered powder layer 56 to the surface of the adhesive layer 2 and a monolayer powder film is formed to the surface of the adhesive layer 2.

The transfer roll 52 has a low adhesive strength on the surface thereof and the adhesive strength is controlled to be lower than that of the adhesive layer 2. According to the controlling, the powder particle 3 which is part of the adhered powder layer 56 can be transferred from the adhered powder layer 56 to the surface of the adhesive layer 2. In the case in which the adhesive strength of the transfer roll 52 is the same as that of the adhesive layer 2 or is higher than that of the adhesive layer 2, the powder particle 3 cannot be transferred. As a roll material of the transfer roll 52 having a low adhesive strength, rubber, urethane rubber, silicone rubber, etc., can be mentioned and the transfer roll 52 is employed by coating the adhesive as described above, etc., on the surface thereof. The adhesive strength can be adjusted by selecting kinds of the adhesive to be coated, adding ratio thereof, hardness of the roll, etc.

Back rolls 57*a*, 57*b*, and 57*c* are placed at the rear surface of the base material 1, as a supporting member 57, in order to maintain an uniform contact between the adhesive layer 2 on the base material 1 and the adhered powder layer 56 adhered to the surface of the transfer roll 52. It is preferable that the feeding speed of the base material 1 be slightly lower than the liner velocity of the transfer roll 52, so that the powder particles 3 are rubbed from the transfer roll 52 to the adhesive layer 2 and are supplied in excess on the adhesive layer 2.

As a transfer roll 52, an electrified roll, in which the powder particles 3 are adhered on the surface thereof by electrostatic force, can be employed. The electrostatic force for adhering the powder particles 3 on the surface the transfer roll 52, is generated by friction between the transfer roll 53 and the powder particle 3. In addition, it is also effective that the transfer roller 52 be charged by loading external voltage. As a transfer roll 52 used in this case, metal rolls made of aluminum, etc., or elastic rolls made of urethane rubber, can be employed. In the case of the elastic roll, it is necessary that electric resistance be optimized by using conductive material inside or on the surface of the roll, since external voltage can be loaded. Furthermore, it is also necessary to adjust a material of the roll and loaded voltage in consideration of electrification series of powders to be used. In addition, the surface of the roll may be smooth and may be uneven so that the powder particles are easily adhered thereto.

FIG. 4 shows an example of an apparatus for forming a monolayer powder film by contacting and transferring powder particles, which are adhered to the surface of a magnetic brush, with an adhesive layer on a base material. The magnetic brush refers to as a magnetic roll comprises a magnet, having alternately magnetic poles S and N inside a roll made of stainless steel, etc., and carrier particles, which are magnetic powders, consisting of iron or ferrite, are adhered in a brush shape to the surface of the magnetic roll by magnetic force. The carrier particle has a particle diameter of 40 to 200 μm, and the powder particles are weakly adhered to the surface of the carrier particle by electrostatic force or magnetic force.

In FIG. 4, in a container 61 for holding powder particles 3, a magnetic brush 66 is formed on the surface of a magnetic roll 63 including a magnet 62. In the case in which the magnetic roll 63 is rotated to the arrow direction, the magnetic brush 66 contacts with an adhesive layer 2 on a base material in the shape of an elongated film 1 which is being transferred in the arrow direction. In the magnetic brush 66, the powder particles 3 are adhered to the surface of each carrier particle by electrostatic force or magnetic force and a spike is formed by connecting the carrier particles, in which the powder particles 3 are adhered, due to magnetic action. When the magnetic brush 66 is contacted with the adhesive layer 2, the powder particles 3 in the magnetic brush 66 are transferred to the surface of the adhesive layer 2, since adhesive strength of the powder particle 3 to the adhesive layer 2 is higher than the electrostatic force or magnetic force to the carrier particles. After the powder particles 3 in the magnetic brush 66 are transferred by contacting with the adhesive layer 2, the carrier particles and the powder particles 3 are contacted in the container 61 by rotating the magnetic roll 63 and the powder particles 3 are replenished in a magnetic brush 66' by frictional electrification, etc.

It is preferable that the container 61 be designed so that the magnetic brush 66 is contacted with the overall width of the adhesive layer 2 on the base material 1, since the base material 1 is in the shape of an elongated film. It is preferable that the container 61 comprise a stirring member 64. According to the stirring member 64, the powder particles 3 are easily adhered to the magnetic brush 66 by stirring the powder particles 3 in the container 61. Although the stirring member 64 is a blade shape in FIG. 4, it is not limited to this shape. The stirring member 64 may be in a spiral shape as another shape. The container 61 may have two or more stirring members.

It is preferable that the magnetic brush 66 control the height thereof using a spike controlling member 65, since the powder particles 3 can be filled in the adhesive layer 2 at a high density. Although the magnet 62 included in the magnetic roll 63 is not rotated in FIG. 4, it may be rotated and the rotating direction thereof is not limited. Although the magnetic roll 63 is rotated in the arrow direction in FIG. 4, it may be rotated in the reverse direction.

As a carrier particle described above, specifically, materials having magnetic properties such as iron particles, ferrite particles, and magnetite particles, can be employed. As a ferrite particle, mixed sintered compacts of MeO—$Fe_2O_3$ can be employed in the present invention. In this case, the Me refers to Mn, Zn, Ni, Ba, Co, Cu, Li, Mg, Cr, Ca, V, etc., and they can be employed alone or in combination. As a magnetite particle, mixed sintered compacts of MeO—$Fe_3O_4$ can be employed in the present invention. In this case, the Me is the same as in the case of the above ferrite. Furthermore, a resin such as silicone resin, acrylic resin, fluororesin, etc., may be coated on the surface of the particle such as iron particles, magnetite particles, and ferrite particles.

The base material 1 which provides the adhesive layer 2 comprises supporting members 67, so as to feed smoothly. The supporting members 67 have also an effect of easily contacting the magnetic brush 66 to the adhesive layer 2 by supporting the base material 1 which provides the adhesive layer 2. Although it is preferable that the supporting members 67 be rotatable rolls, as shown in FIG. 4, the shape thereof is not limited, if they can support the base material 1 even if they are unrotatable rolls, etc. Although it is preferable that the supporting members 67 be placed at an opposite position to the magnetic roll 66 sandwiching the base material 1 which provides the adhesive layer 2 since the powder particles 3 can be embedded in the adhesive layer 2 at a high density, they may be placed at only two positions 67*a* and 67*c* and the numbers and the positions thereof are not limited if they can support the base material 1.

It is necessary that the above method for contacting and transferring the powder particles to the adhesive layer on the base material, be properly selected depending on characteristics of powder particles to be used, that is, electric characteristics, magnetic characteristics, size, specific gravity, etc. In the case in which the powder particles have easily frictional-electrification, it is preferable that the surface of an electrified roll which adheres the powder particles by weak static electricity or a magnetic brush be used, and in the case in which the powder particle has weak magnetic properties, it is preferable that a magnetic brush be used. In the case in which the powder particle does not have magnetic properties and consists of metal having high conductivity, etc., it is preferable that a roll having weak adhesive strength be used.

Since the contacting and transferring of the powder particles are phenomena in which the transfer roll or the magnetic brush and the surface of the adhesive layer on the base material scramble for the powder particles, it is necessary to optimize materials of the transfer roll, etc., or a combination of the roll and the powder particles, so that adhesive strength of the transfer roll or the magnetic brush and the powder particle is lower than that of the adhesive layer and the powder particle, in order to transfer effectively. In a method for using the magnetic brush, it is necessary that adhesive strength of the magnetic roll and the carrier particle be sufficiently increased, since there is a risk that not only the powder particles, but also the carrier particles, will be transferred to the adhesive layer.

A powder supplying apparatus can be installed in the container for containing the powder particles, although this is not shown in FIGS. 3 and 4. It is preferable to cover it to prevent foreign matter from contaminating and the powder particles from scattering, although the container may be open at an upper portion in the FIGS. 3 and 4.

In the method for using the magnetic brush, it can be expected that the powder particles are struck and embedded by the carrier particles and a more uniform monolayer powder film is formed, since there is a risk that the powder particles adhered to the adhesive layer will contact the following carrier particle. In the present invention, it is possible to extend the processing time of the above powder adhering process and to carry out the process two times or more, in order to form the more uniform monolayer powder film.

3. Powder Embedding Device

It is preferable that the powder embedding device in the production apparatus for the monolayer powder film of the present invention comprise a mechanism for vibrating media, in order to form a monolayer powder film in which powder particles are uniformly and closely embedded in the planar direction. The powder particles adhered to the surface of the adhesive layer can be embedded by this mechanism for vibrating media, using impulsive force through media. In the following, preferable embodiments of the powder embedding device used in the present invention will be explained.

(1) First Embodiment

Figure 5:
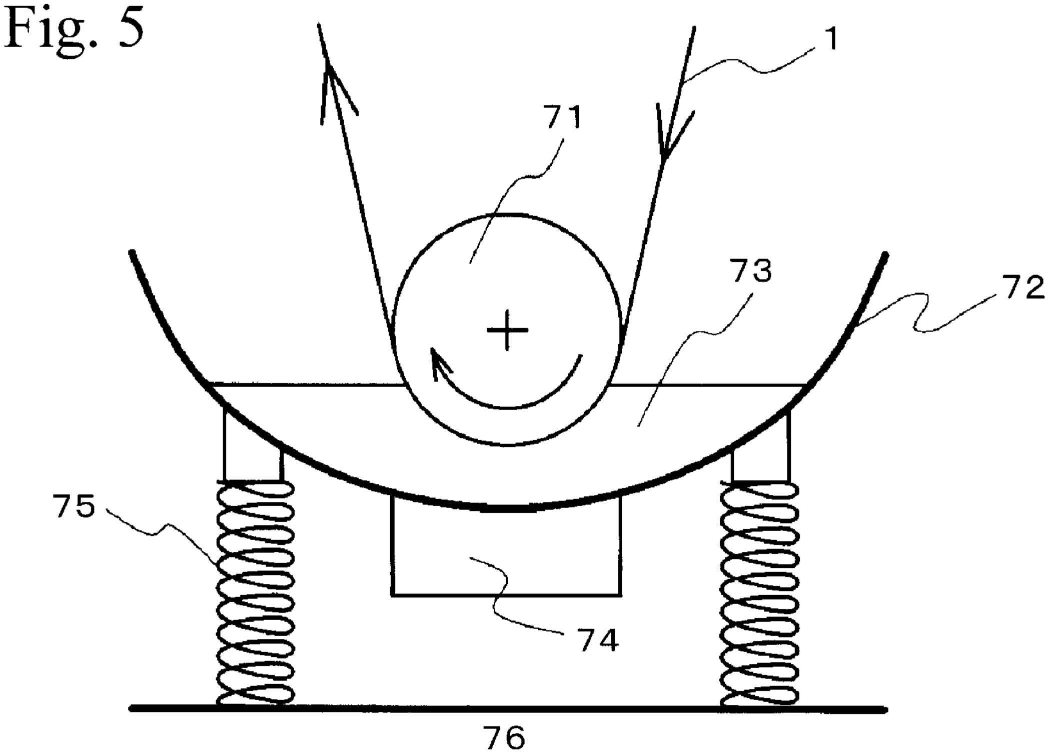
FIG. 5 shows a sectional schematic view of an example of a powder embedding device in a production apparatus for a monolayer powder film according to the present invention.

FIG. 5 shows a sectional view of a first embodiment of the powder embedding device in the production apparatus for the monolayer powder film of the present invention. In the first embodiment, as shown in FIG. 5, a base material in the shape of an elongated film 1 which provides an adhesive layer is fed while contacting the surface of the base material 1 with a roll 71, and the roll 71 is immersed at a depth of ⅓ of diameter thereof by a mixture of powder particles and media 73 in a container 72. The roll 71 is mounted to a different frame from that of the container 72, so that vibration is directly transmitted. A vibrating motor 74 is installed directly under the container 72 unitarily, and they are fixed to a floor 76 by springs 75. The mixture of powder particles and media 73 are vibrated by the container 72 which are vibrated by the vibrating motor 74 and the powder particles are embedded in the adhesive layer by passing into the mixture 73, since the adhesive layer in the base material in the shape of an elongated film 1 which provides the adhesive layer is placed at an opposite surface to the roll 71. It is preferable that the roll 71 be immersed at a depth in which the powder particle is not adhered to an opposite surface of the base material in the shape of an elongated film 1 to the adhesive layer, and that the roll 71 be immersed to the mixture of powder particles and media 73 at a depth of ⅓ of the diameter thereof. This depth can prevent the powder particles from adhering to an opposite surface of the base material in the shape of an elongated film 1 to the adhesive layer.

(2) Second Embodiment

Figure 6:
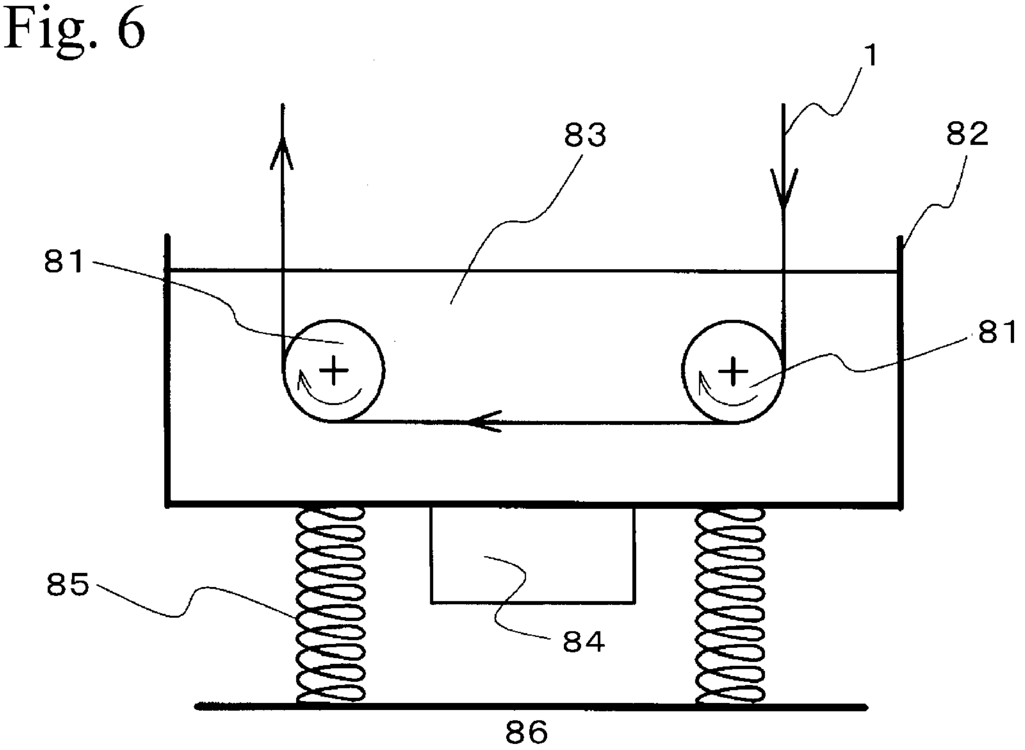
FIG. 6 shows a sectional schematic view of another example of a powder embedding device in a production apparatus for a monolayer powder film according to the present invention.

FIG. 6 shows a sectional view of a second embodiment of the powder embedding device in the production apparatus for the monolayer powder film of the present invention. In the second embodiment, as shown in FIG. 6, two rolls 81 are placed in a container 82 although the rolls 81 are mounted to a different frame from that of the container 82. A base material in the shape of an elongated film 1 which provides the adhesive layer is passed through these rolls 81. Although the present device is the same as the first embodiment in theory, it has an advantage. Feeding speed of the base material in the shape of an elongated film 1 which provides the adhesive layer can be increased, since the base material in the shape of an elongated film 1 can be immersed in a mixture of powder particles and media 83 in the container 82 over a longer length than that of the first embodiment, and consequently, the opportunity for the powder particles to be embedded in the adhesive layer by the media, is increased. In addition, since the base material in the shape of an elongated film 1 which provides the adhesive layer contacts with the powder particles until the base material reaches the roll 81 in the container 82, the powder particles can be embedded on both surfaces of the base material in the shape of an elongated film 1 in the case in which an adhesive layer is provided on the both surfaces of the base material in the shape of an elongated film 1.

(3) Third Embodiment

Figure 7:
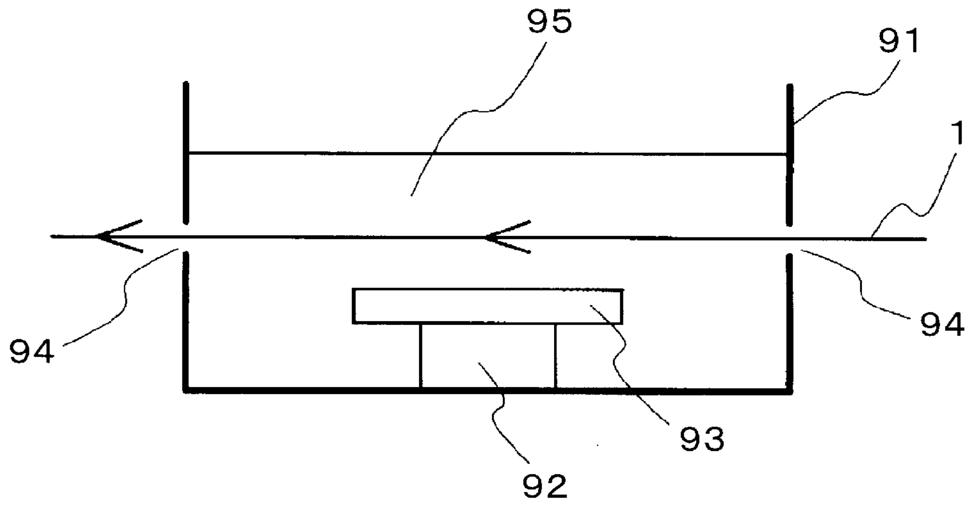
FIG. 7 shows a sectional schematic view of another example of a powder embedding device in a production apparatus for a monolayer powder film according to the present invention.

FIG. 7 shows a sectional view of a third embodiment of the powder embedding device in the production apparatus for the monolayer powder film of the present invention. In the third embodiment, as shown in FIG. 7, a container 91 is fixed and a vibrating plate 93 is vibrated in a vertical direction by an electromagnetic vibrator 92. A base material in the shape of an elongated film 1 which provides an adhesive layer is passed through two slits 94, which are opened at a right side and a left side of the container 91, into the container 91 and a mixture of powder particles and media 95 put therein. In this case, it is necessary that openings of the slits 94 be more narrow than the particle diameter of the media, so that the media do not fall out of the slits 94 to the outside of the container 91. Although the electromagnetic vibrator and the vibrating plate are used in the present embedding device in FIG. 7, these are not essential, and the manner for vibrating a container similar to the first embodiment and the second embodiment may be adopted.

In the first embodiment and the second embodiment, there is a risk that the powder particles or the media will be sandwiched between the base material in the shape of an elongated film 1 and the roll(s) 71 or 81, and in which the base material in the shape of an elongated film 1 is damaged by particle size of the media or tension of the base material in the shape of an elongated film 1. It is effective to use a roll in which grooves are cut or a roll in a net shape, so that the powder particles and the media sandwiched between the base material in the shape of an elongated film 1 and the roll(s) 71 or 81, are held into the groove or are passed through the net, in order to solve the problem. It is also preferable to support only both side edges of the base material in the shape of an elongated film 1 by rolls, belts, guiding holders, etc.; to carry out knurling at both side edges of the base material in the shape of an elongated film 1; or to feed the base material in the shape of an elongated film 1 which carried a sprocket processing, using a exclusive roll.

In any of the above embodiments, the base material in the shape of an elongated film 1 which provides the adhesive layer is dipped into the powder particles and the media. Therefore, in this case, it is necessary to previously adjust the suitable depth to be dipped, since the pressure applied to the adhesive differs depending on the depth to be dipped. Generally, the case in which the base material in the shape of an elongated film 1 is placed very deep, that is, the case in which vibration is given to the adhesive layer on the base material in the shape of an elongated film under high pressure condition, is not preferred, since the possibility exists that powder particle falling off will be increased, although this differs depending on density of the medium. The powder particles may be sufficiently embedded in the adhesive layer merely by softly contacting only the adhesive layer with the surface of the powder particles and the media which are vibrating.

(4) Fourth Embodiment

A fourth embodiment of the powder embedding device in the production apparatus for the monolayer powder film of the present invention comprises a container which vibrates at least in the thickness direction of the base material while maintaining a state which is parallel to the width direction of the base material; media filled in the container; and a supporting member for contacting with the base material, for guiding the base material into the media, and for supporting impulsive force occurring due to vibration of the container, and is characterized in that the impulsive force extending in the width direction is added from the thickness direction of the base material using the media.

Figure 8:
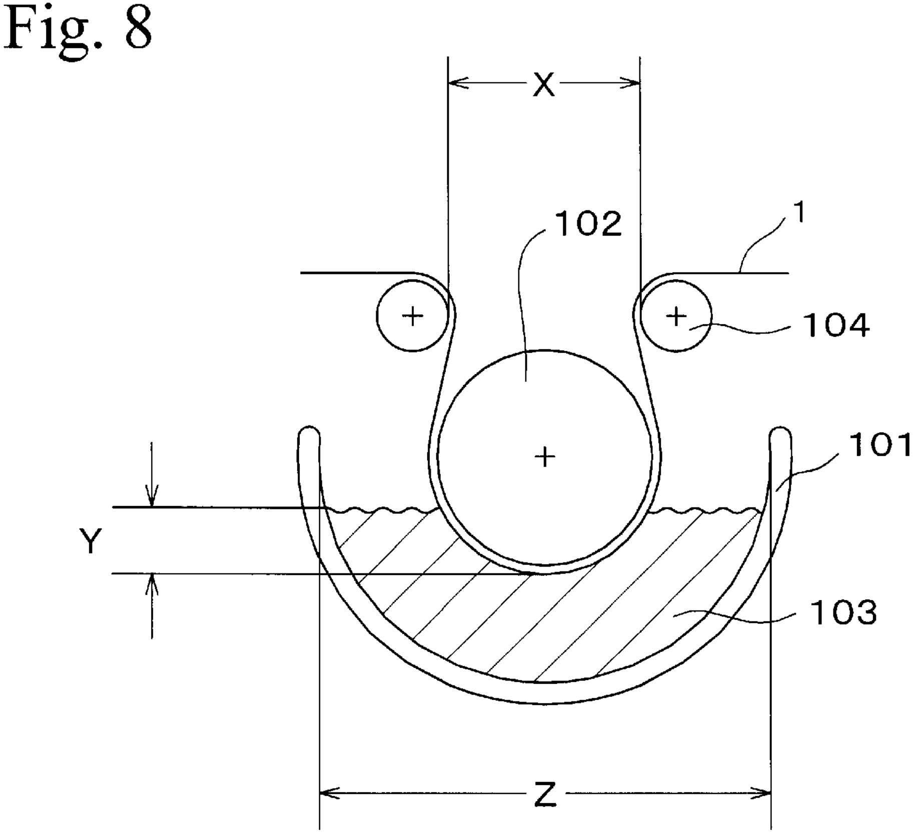
FIG. 8 shows a sectional schematic view of another example of a powder embedding device in a production apparatus for a monolayer powder film according to the present invention.

FIG. 8 shows a sectional view of a fourth embodiment of the powder embedding device in the production apparatus for the monolayer powder film of the present invention. As shown in FIG. 8, the fourth embodiment comprises a container 101 which is parallel to the width direction of the base material 1, and a supporting member 102 for contacting with the base material 1, which is placed at an opposite side of the base material 1 to the container 101. The container 101 can be vibrated in the thickness direction of the base material 1 and the supporting member 102 is fixed so as not to be affected by vibration of the container 101. Media 103 are filled in the container 101 and guiding members 104 for guiding the base material 1 to the supporting member 102 is further comprised in the fourth embodiment.

The container in the fourth embodiment has a mechanism in which for vibrating at least in the thickness direction of the base material in the shape of an elongated film while keeping a state which is parallel to the width direction of the base material. According to this mechanism, the powder particles adhered to the adhesive layer on the base material can be struck from a thickness direction of the base material by vibrating the media filled in the container. Vibration of the container may be either in a vertical direction or a longitudinal direction if it is a thickness direction of the base material, and it may also be a circular vibration or an elliptical vibration.

In addition, it is preferable that the container in the fourth embodiment have a sectional shape which is uniform in the width direction of the base material. According to this shape, the media can be uniformly vibrated in a width direction of the base material, and thereby the powder particles can be uniformly embedded in the adhesive layer.

The supporting member in the fourth embodiment is placed at an opposite side of the base material to the above container, so as to contact with the surface, which is not provided with the adhesive layer, of the base material. The supporting member has a surface extending parallel to the base material in the shape of an elongated film. In the supporting member, the base material is guided into the media filled in the container along this surface, and then the powder particles on the adhesive layer are contacted with the media which are vibrating. A contacting surface of the supporting member with the base material supports impulsive force at which the media strike the powder particles on the adhesive layer using vibration of the container.

Figure 9:
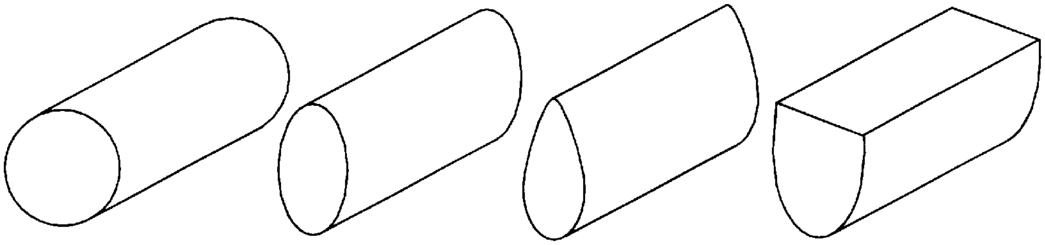
FIG. 9 shows an oblique schematic view of supporting members which are suitable for the powder embedding device shown in FIG. 8.
Figure 10:
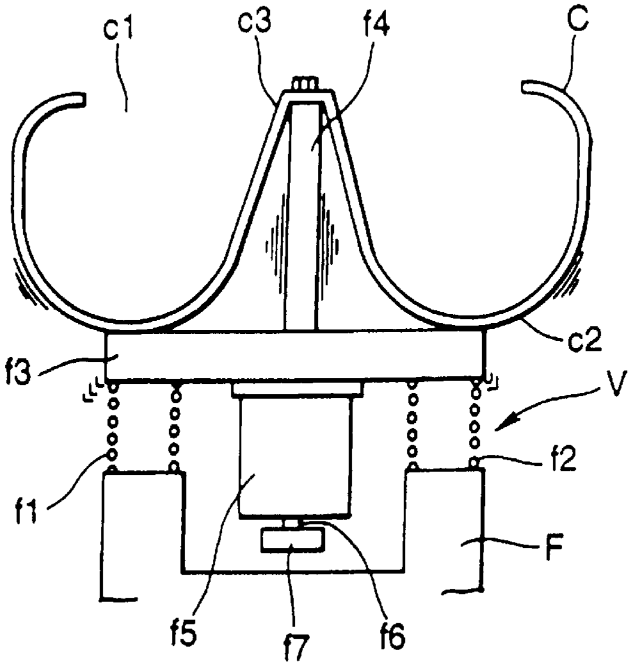
FIG. 10 shows a sectional schematic view of a powder embedding device in a conventional production apparatus for a monolayer powder film.

It is preferable that such a supporting member be a member in which a sectional shape thereof is uniform in the width direction of the base material, and in which at least the lower portion of the sectional shape is a curved shape. Specifically, supporting members having a sectional shape such as a round shape, elliptical shape, waterdrop shape, bullet shape, etc., as shown in FIG. 9, are preferred. According to the supporting member having any of these sectional shapes, a curved shape portion thereof forms a contacting surface with the base material, and therefore, the base material in the shape of an elongated film can be smoothly guided into the container along this contacting surface. In the case in which the supporting member is a cylindrical roll, the roll can be rotated while feeding the base material. In contrast, in the case in which the supporting member has another shape, the base material is fed by sliding along a parallel surface to the base material, of the supporting member. Therefore, as a material for the supporting member, materials having a low friction to the base material can be preferably employed.

It is preferable that the supporting member comprise guiding members 104 for guiding the base material 1 so as to be closed to the contacting surface with the base material, as shown in FIG. 8. The guiding member 104 can narrow an opening between the supporting member 102 and the base material 1 and can prevent the media 103 from entering in the opening. If the media enter between the supporting member and the base material, there is a risk that the base material will be deformed or damaged.

In addition, in the case in which the sectional shape of the supporting member is a shape in which the width thereof tapers toward an upper portion, such as a round shape, elliptical shape, waterdrop shape, etc., the distance between the guiding members 104 can be narrowed to be smaller than the maximum sectional width of the supporting member, as shown in FIG. 8, and therefore, the above media can be more reliably prevented from entering.

In the fourth embodiment, although the above device for preventing the media from entering between the supporting member and the base material is taken, a medium removing device for removing media which are entering into the opening between the supporting member and the base material, can be comprised. As a method for removing the media by the medium removing device, any of methods for sucking, blowing, shaving, wiping, etc., can be employed. It is preferable to remove the media just before the base material contacts the supporting member.

4. Excess Powder Removing Device

After powder particles were embedded in an adhesive layer, an excess powder removing device in the present invention removes excess powder particles adhered by interparticle forces such as electrostatic forces, van der Waals forces, etc. In the present invention, a water jet in which water is jetted out of nozzles 41, as shown in FIG. 2, is effective as an excess powder removing device. In addition, on the surface of the base material 1 in which the powder particles are not embedded, the base material 1 is pressed on a sponge sheet 43 under water in a water tank 42 by a pressing roll 44, and thereby the excess powder particles can be wiped off by pressing. In the case in which the diameter of the powder particle is 15 $\mu$m or less, it is preferable that the powder layer be soaked in ion exchanged water to which is added a washing auxiliary agent such as a surfactant, etc., and be subjected to ultrasonic washing, etc., and then be rinsed sufficiently by deionized water, etc., and be dried, since there is a risk that the excess powder particles will be insufficiently removed by use of fluidic pressure alone.

It is necessary to finally remove water, after such water cleaning has been carried out. Therefore, in the excess powder removing device in the present invention, it is preferable to comprise a device for blowing away water by air nozzles 46 to drain water, or for absorbing water by absorptive rolls 47, etc. Furthermore, in the case in which water is not completely removed by the above method, depending on the type of the base material in the shape of an elongated film or the powder particles, it is preferable to dry by heating it using infrared heaters 48 or by exposing it to cool or hot blown air for sufficient time.

5. Working of Production Apparatus for Monolayer Powder Film

In a composition shown in FIG. 2, working of the production apparatus for the monolayer powder film of the present invention will be explained. A base material in the shape of an elongated film 1 in which an adhesive layer is previously laminated to one surface thereof, in which a separatable substrate 5 is provided on the surface of the adhesive layer, and which is wound, can be employed in the present production apparatus for the monolayer powder film. The wound base material in the shape of an elongated film 1 is fed to a peeling device 10 through driven rolls while unwinding by an unwinding device. In the unwinding device 10, the base material 1 is guided between a heating roll 11 and an opposite roll 12, and flexibility of the adhesive layer is increased by heating the adhesive layer using the heating roll 11. At the same time at which the base material 1 is passed between the roll pair 11 and 12, the separatable substance 5 on the adhesive layer is peeled and wound to a winding roll 14 through a roll 13. During this time, peeling angle and peeling speed of the separatable substrate 5 are uniformly maintained. By the way, the base material 1 which peeled the separatable substrate 5 is guided to an adhering device 20. In this adhering device 20, the powder particles 23 are uniformly fluidized in a width direction of the base material 1 in a container 22 by a stirrer 21, and thereby the powder particles 23 can be uniformly adhered in a width direction of the base material 1 to the adhesive layer on the base material 1 which is guiding.

Next, the base material 1 in which the powder particles 23 were adhered is guided to a powder embedding device 30. In the powder embedding device 30, the base material 1 is guided, so that the surface of the base material 1, in which the powder particles were adhered, faces to one guiding member 34, and then it is guided, so that an opposite surface of the base material 1 to the above surface contacts with a supporting member 32. Subsequently, the base material 1 is fed along the supporting member 32, and then is guided, so that the surface of the base material 1, in which the powder particles were adhered, faces to the other guiding member 34. In a container 31, media 33 is filled at a depth of ⅓ of the diameter of the supporting member 32. Therefore, a state in which a surface of the base material 1 in which the powder particle is not adhered contacts with a lower half portion of the supporting member 32 and in which the powder particles on the base material 1 contact with the media 33, is formed.

In this state, the base material 1 is fed downstream of the present apparatus, while the container 31 is vibrating in the width direction of the base material 1. In this case, the supporting member 32 and the guiding members 34 are driven by feeding of the base material 1. The media 33 are vibrated by vibration of the container 31, and the powder particles on the base material are struck by the media 33. Uniform impulsive force in the width direction of the base material 1 is thereby continuously loaded on the powder particles, the powder particles are embedded to a uniform depth, and therefore, a monolayer powder film in which the powder particles are uniformly and closely embedded in the planar direction in the adhesive layer, so that part of the powder particle protrudes, is formed.

Next, the base material 1 is guided to an excess powder removing device 40. Both surfaces of the base material 1 are cleaned by water jets using shower nozzles 41; then the base material 1 is guided into water filled in a water tank 42; and excess powder particles on the surface of the base material in which the powder particle is not embedded, are wiped away by pressing using a pressing roll 44 to a sponge sheet 43. Then, the base material 1 is pulled up from the water, both surfaces of the base material 1 are rinsed by water jets using shower nozzles 45, and in addition, water adhered to the base material 1 is blown away by an air blower using air nozzles 46 for draining water and is absorbed by absorptive rolls 47. Subsequently, the base material 1 is heated by an infrared ray heater 48 and is completely dried, and therefore, a monolayer powder film in the shape of an elongated film in which excess powder particle is not adhered is produced. Then, this monolayer powder film in the shape of an elongated film is wound by a winding device 7, and a state which can be supplied to a next process is formed.

EXAMPLES

Next, the effects of the present invention are more specifically explained by Examples according to the present invention and Comparative Example.

a. Preparation of Acrylic Polymer

Firstly, preparation of acrylic polymer, which is a main component of the acrylic-type adhesive employed in each adhesive layer of the Examples and the Comparative Example, is explained.

94 parts by weight of n-butyl acrylate, 3 parts by weight of acrylic acid, 1 weight part of 2-hydroxy acrylate, 0.3 parts by weight of benzoyl peroxide, 40 weight part of ethyl acetate, and 60 parts by weight of toluene were added in a flask having a thermometer, a stirrer, a reflux condenser, and a nitrogen feeding tube. The flask was filled with nitrogen by feeding nitrogen thereinto through the nitrogen feeding tube, and was heated to 65° C., and the polymerization reaction was allowed to proceed for 10 hours. An acrylic polymer solution having a weight average molecular weight of about 1,000,000 and a Tg of about −50° C. was thereby obtained. Subsequently, methyl isobutyl ketone was added in this acrylic polymer solution so that a solid concentration thereof was 20% by weight, and therefore, an acrylic polymer was prepared.

b. Production of Powder Film

Next, production of powder films of Examples 1 to 4 and Comparative Example 1 having an adhesive layer employing the above acrylic polymers is explained.

Example 1

An adhesive to which is added 0.35 parts by weight of isocyanate-type hardener (trade name: L-45; produced by Soken Chemistry Co., Ltd.) and 0.15 parts by weight of epoxy-type hardener (trade name: E-5XM; produced by Soken Chemistry Co., Ltd.) to 100 parts by weight of the above acrylic polymer, was coated on one side of a triacetyl cellulose film having a thickness of 80 μm (trade name: Fuji Tac UVD80; produced by Fuji Photo Film Co., Ltd.) used as a base material, by a reverse coater, so as to have a thickness of 3 μm after drying, and was dried at 100° C. for 2 minutes, and an adhesive layer was formed. Then, a separatable PET film (trade name: 3801; produced by Lintec Corporation) was laminated on this coating surface, and the coated base material was rolled. Subsequently, the adhesive layer was cured by standing for 1 week in a constant temperature oven kept at 40° C., and an adhesive sheet was thereby produced.

Next, methylsilicone beads (trade name: Tospearl 145; produced by GE Toshiba Silicone Co., Ltd.) having a volume average particle diameter of 4.5 μm, particle size distributions of 0.94, refractive index of 1.43, and roundness of 96%, used as a powder particle, was put into a container of a powder adhering device in a production apparatus for a monolayer powder film shown in FIG. 3. Subsequently, this container was vibrated, and the powder particles were flowed by synergistic effects of the vibration and the jetted air. The above film provided with an adhesive layer on the surface was passed therethrough for an appropriate period, and the powder particles were thereby adhered on the surface of the adhesive layer. A transfer roll in the above powder adhering device is a silicone rubber roll, and silicone adhesive having a low adhesion is previously coated on the surface of the roll. A powder adhered layer was thereby formed on the surface thereof by rotating the transfer roll, after the above powder particles were put into the container. Then, the separatable PET film was peeled from the above adhesive sheet, the transparent base material having adhesion on the surface thereof was fed as shown in FIG. 3, and a monolayer powder film was formed on the surface of the adhesive layer. The powder particles did not contaminate the area around the production apparatus for a monolayer powder film.

Subsequently, the excess powder particles were cleaned off and removed by soaking the laminated body in 0.1% aqueous solution in which surfactant (trade name: Liponox NC-95; produced by Lion Corporation) was added to ion exchanged water and by using ultrasonic waves. Next, the film was sufficiently cleaned by ion exchanged water, and then water was drained off the surface thereof by an air knife and was dried. Subsequently, the film was sufficiently dried by being left in a constant temperature oven at 40° C. for 3 days and was cooled to room temperature, and a monolayer powder film of Example 1 according to the present invention was thereby formed.

Example 2

A monolayer powder film of Example 2 was formed in the same manner as that of Example 1, except that a production apparatus for a monolayer powder film, in which voltage was applied to a transfer roll consisting of urethane rubber which has electroconductive material on the surface thereof, was used instead of the production apparatus for a monolayer powder film with the transfer roll having a low adhesion on the surface thereof. In the production apparatus for a monolayer powder film, the powder particles were adhered to the surface of the transfer roll by electrostatic force. The powder particles did not contaminate the area around the production apparatus for a monolayer powder film.

Example 3

A monolayer powder film of Example 3 was formed in the same manner as that of Example 1, except that a powder adhering device in a production apparatus for a monolayer powder film shown in FIG. 4 was used instead of the powder adhering device in the production apparatus for a monolayer powder film shown in FIG. 3. As a carrier particle, a ferrite particle having an average particle diameter of 90 μm was used. The powder particles did not contaminate the area around the production apparatus for a monolayer powder film.

Example 4

A monolayer powder film of Example 4 was formed in the same manner as that of Example 1, except that a powder embedding device in a production apparatus for a monolayer powder film shown in FIG. 8 was used instead of the powder adhering device in the production apparatus for a monolayer powder film shown in FIG. 3.

In the production apparatus for a monolayer powder film in FIG. 8, a space x of a guiding member 104 is 15 cm, a diameter of a supporting member 102 in a roll shape is 20 cm, a depth y of the supporting member 102 in media 103 is 7 cm, and a width z of a container 101 is 30 cm. Perfectly globular zirconia particles having a particle diameter of 0.5 mm as a medium and the above powder particles were put into the container 101, and the container 101 was vibrated at 1800 cpm according to an elliptical motion of 3 mm in the vertical direction and 1 mm in the horizontal direction in FIG. 8.

The transparent base material in the shape of an elongated film having an adhesive layer on the surface thereof was fed at 1 m/min from the left to the right in FIG. 8. the above film having the powder layer was passed through a vibrating mixture of the powder particles and the media, the powder particles were struck by impulsive force due to the globular zirconia particles and were embedded into the adhesive layer, and a monolayer powder film was thereby formed.

Comparative Example 1

The methylsilicone beads of Example 1 as a powder particle were sprayed on the transparent base material film of Example 1 having the adhesive layer, which peeled the separatable PET film, using an electrostatic powder coating gun (trade name: GX-108, produced by Chichibu Onoda Co., Ltd.), and the beads were thereby adhered to the adhesive layer without applied voltage.

Then, the adhered powder layer was leveled on the surface so as to have a thickness of 12.5 μm or less, using a YBA-type baker applicator (produced by Yoshimitsu Seiki Co., Ltd). Subsequently, the film to which the powder particles were adhered was inserted into a pressure roller (trade name: Lamipacker PD3204; produced by Fujipla Inc.) at a speed of 1.5 cm/second, and a filler was thereby embedded in the adhesive layer. Then, the removing process for excess powder particles was performed in the same manner as that of Example 1, the film was dried, and a monolayer powder film of Comparative Example 1 was thereby formed.

c. Observation of Powder Layer

Figure 11:
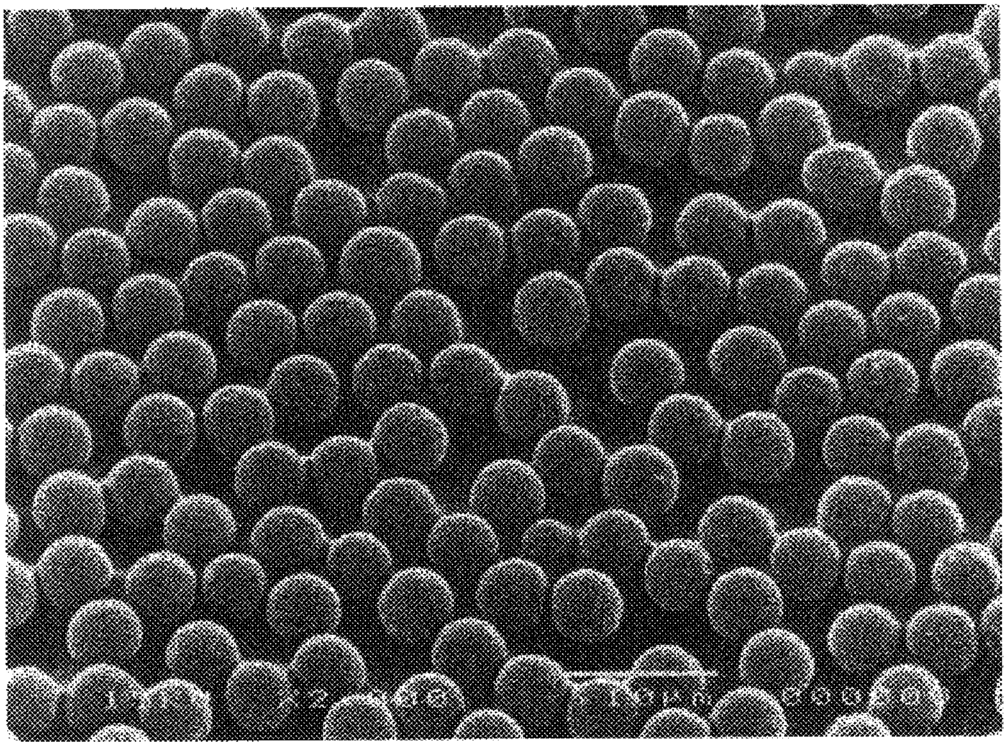
FIG. 11 shows a photomicrograph of a plane view of a monolayer powder film of Example 1 at a magnification of 2,000 times.
Figure 12:
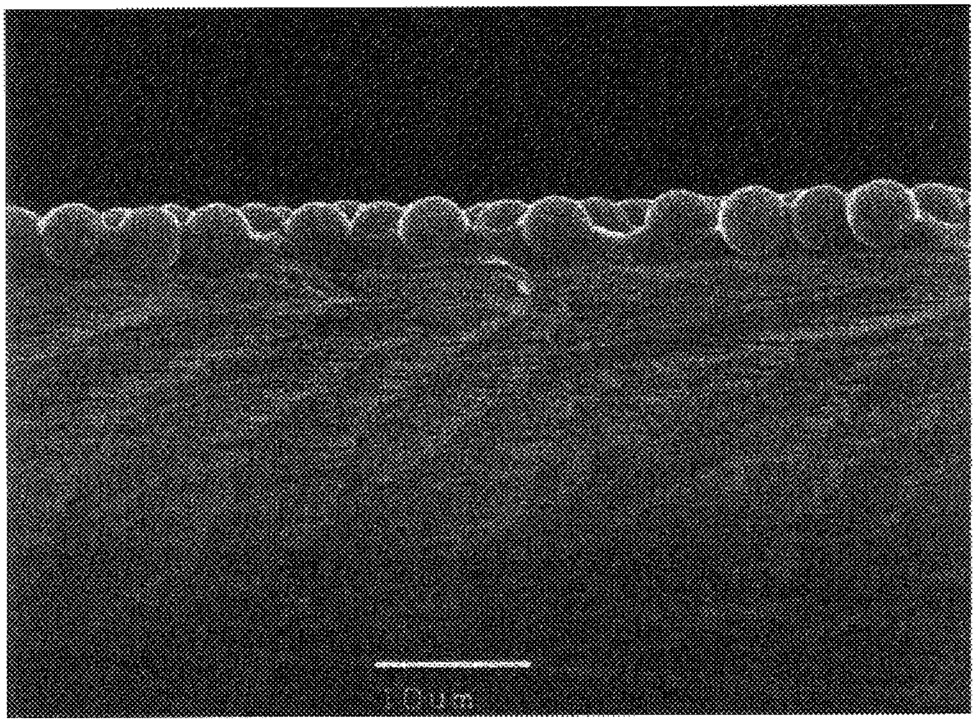
FIG. 12 shows a photomicrograph of a sectional view of a monolayer powder film of Example 1 at a magnification of 2,000 times.

Plane views and sectional views of powder films of Examples 1 to 4 and Comparative Example 1 formed according to the above methods were observed by an electron microscope. FIGS. 11 and 12 show electron photomicrographs of a plane view and a sectional view of a monolayer powder film of Example 1 at a magnification of 2,000×. As shown in the plane photomicrograph of FIG. 11, the powder particles had uniformly been filled to a high density in the powder films of Example 1. As shown in the sectional photomicrograph thereof, the powder particles were embedded to uniform depth so that part of the powder particle protrudes from the surface of the adhesive layer. Although Examples 2 to 4 are not shown, the powder particles had been uniformly filled to a high density in each powder film and the powder particles had been embedded to uniform depth so that part of the powder particle protrudes from the surface of the adhesive layer, in the same manner as Example 1.

Figure 13:
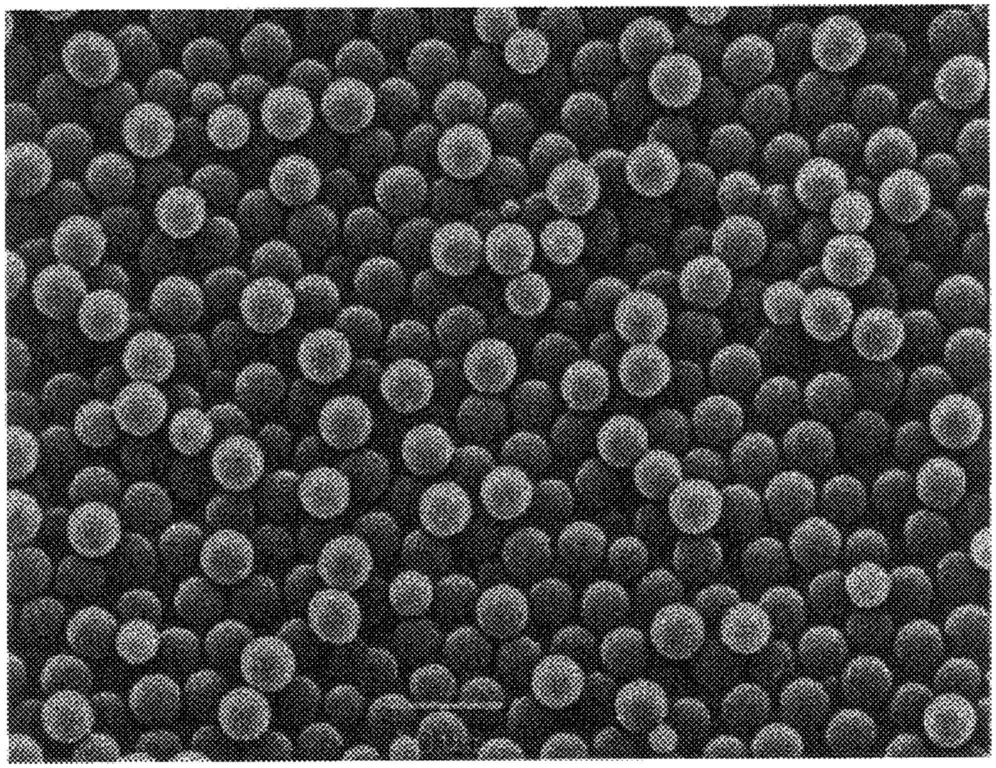
FIG. 13 shows a photomicrograph of a plane view of a monolayer powder film of Comparative Example 1 at a magnification of 1,500 times.
Figure 14:
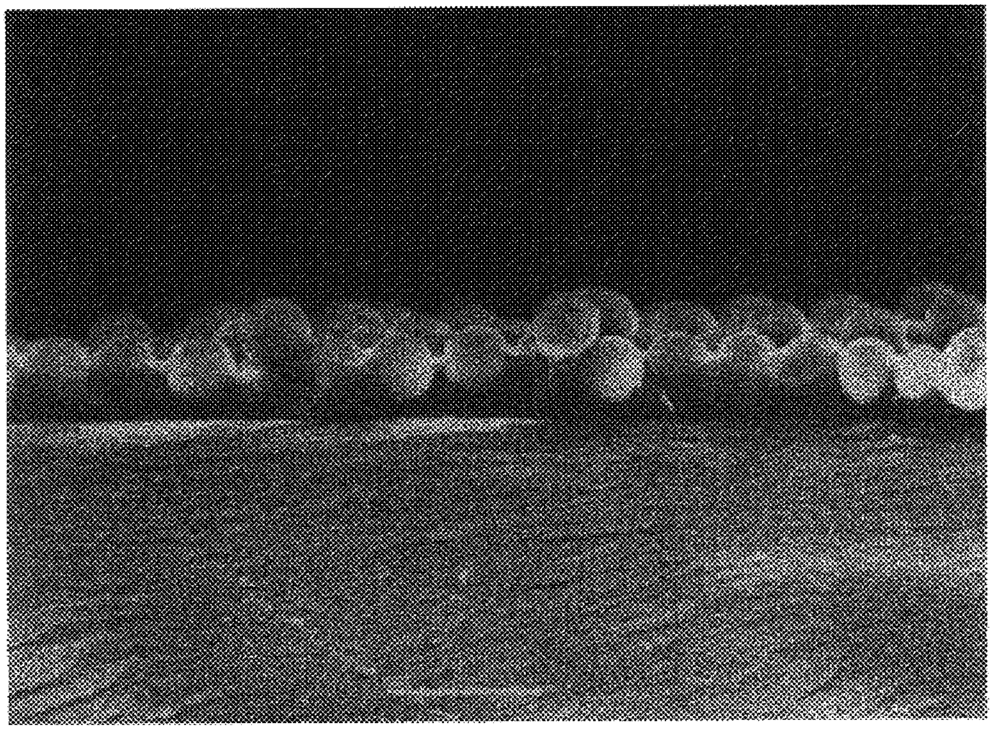
FIG. 14 shows a photomicrograph of a sectional view of a monolayer powder film of Comparative Example 1 at a magnification of 2,000 times.

In contrast, FIG. 13 shows an electron photomicrograph of a plane view of a monolayer powder film of Comparative Example 1 at a magnification of 1,500×, and FIG. 14 shows an electron photomicrograph of a sectional view thereof at a magnification of 2,000×. When these photomicrographs are compared with FIGS. 11 and 12, in a powder film of Comparative Example 1 in which the powder particles are embedded therein by a pressing roller, the filling density of the powder particles was not uniform, and regions where the powder particles had been embedded as a multiple layer and regions where filling density of the powder particles was low therefore existed, and therefore, embedded depths of the powder particles were not uniform.

As explained above, according to the production method for the monolayer powder film of the present invention, a monolayer film in which the powder particles are uniformly placed can be formed on the surface of an adhesive layer provided on a base material in the shape of an elongated film at high productivity, even if a fine powder particle is used.

In addition, according to the production apparatus for the monolayer powder film of the present invention, there is no contamination due to scattering of the powder particles, and a monolayer powder film having a high density can be formed on the adhesive layer on the base material. Furthermore, a monolayer powder film, in which powder particles are uniformly and closely embedded in the planar direction on the surface of an adhesive layer is provided, so that part of the powder particle protrudes, can be continuously produced, even if the base material is in the shape of an elongated film.

What is claimed is:

1. A production method for a monolayer powder film on a base material in a shape of an elongated film, consisting of plural powder particles embedded on the surface of an adhesive layer provided on a base material in the shape of an elongated film as a monolayer, so that part of said powder particle protrudes, comprising, in a continuous process of feeding the base material in the shape of an elongated film from an unwinding device to a winding device:

forming said adhesive layer on at least one surface of said base material;

adhering said powder particles to said adhesive layer so as to form a laminate;

embedding said powder particles on the surface of said adhesive layer as a monolayer, so that part of said powder particle protrudes, by contacting said adhesive layer with other powder particles and media vibrated in a container; and removing excess powder particles adhered to said laminate.

2. The production method for the monolayer powder film on a base material in a shape of an elongated film in accordance with claim 1, wherein a sticking process for sticking a separatable substrate on said adhesive layer, and an exposing process for exposing said adhesive layer by peeling said separatable substrate, are further comprised after said adhesive layer forming process.

3. The production method for the monolayer powder film on a base material in a shape of an elongated film in accordance with claim 1, wherein said adhesive layer forming process is a process in which an adhesive layer previously provided on a separatable substrate is adhered to said base material and then said adhesive layer is provided on said base material by peeling said separatable substrate and by transferring to said base material.

4. The production method for the monolayer powder film on a base material in a shape of an elongated film in accordance with claim 3, wherein fluidized powder particles are contacted with said adhesive layer in said powder adhering process.

5. The production method for the monolayer powder film on a base material in a shape of an elongated film in accordance with claim 1, further comprising a coating process in which a resin layer is coated on said monolayer powder film of said laminate from which is removed said excess powder particles.

6. The production method for the monolayer powder film on a base material in a shape of an elongated film in accordance with claim 1, wherein said resin layer contains acrylic adhesive and has a thichness sufficient to embed said powder particles as a monolayer by said media.

7. The production method for the monolayer powder film on a base material in a shape of an elongated film in accordance with claim 1, wherein said media are granular, and said powder particles are embedded on said adhesive layer by impulsive force due to vibration of said media.

8. The production method for the monolayer powder film on a base material in a shape of an elongated film in accordance with claim 1, wherein wet-type cleaning using water or a water solution to which is added cleaning auxiliary components is carried out in said excess powder removing process, and then a drying process for drying said laminate is conducted.

9. The production method for the monolayer powder film on a base material in a shape of an elongated film in accordance with claim 3, wherein said powder adhering process is a process in which powder particles adhered to the surface of a transfer roll or powder particles adhered on a magnetic brush are contacted and transferred to said base material and said powder particles are thereby adhered to said base material.

10. The production method for the monolayer powder film on a base material in a shape of an elongated film in accordance with claim 9, wherein said transfer roll has a low adhesive property and said powder particles are adhered thereto by said adhesive property.

11. The production method for the monolayer powder film on a base material in a shape of an elongated film in accordance with claim 9, wherein said transfer roll is a mechanism in which said powder particles are adhered to the surface thereof by at least one of applying voltage and static electricity occurring due to friction with said powder particles.

12. The production method for the monolayer powder film on a base material in a shape of an elongated film in accordance with claim 9, wherein said magnetic brush consists of spikes of carrier particles formed on the surface of a magnetic roll by magnetic force, and said powder particles are adhered to the surface of said carrier particles by at least one of static electricity and magnetic force.

* * * * *